United States Patent [19]
Mizuno et al.

[11] Patent Number: 5,729,627
[45] Date of Patent: Mar. 17, 1998

[54] APPARATUS FOR AND METHOD OF JUDGING DOTTED IMAGE AREA

[75] Inventors: Masayuki Mizuno; Masaya Fujimoto; Haruo Yamamoto; Hidechika Kumamoto, all of Osaka, Japan

[73] Assignee: Mita Industrial Co., Ltd., Osaka, Japan

[21] Appl. No.: 556,839

[22] Filed: Nov. 2, 1995

[30] Foreign Application Priority Data

Nov. 16, 1994 [JP] Japan .................................. 6-282223
Nov. 16, 1994 [JP] Japan .................................. 6-282224
Nov. 16, 1994 [JP] Japan .................................. 6-282225

[51] Int. Cl.$^6$ .......................... H04N 1/387; H04N 1/40
[52] U.S. Cl. .................. 382/173; 382/176; 382/273; 358/453; 358/462
[58] Field of Search ............................... 358/453, 458, 358/459, 456, 538, 536, 525, 462, 522; 382/173, 176, 282, 273

[56] References Cited

U.S. PATENT DOCUMENTS

| | | | |
|---|---|---|---|
| 4,547,811 | 10/1985 | Ochi et al. | 358/455 |
| 5,418,626 | 5/1995 | Semasa | 358/453 |
| 5,513,282 | 4/1996 | Williams | 358/453 X |
| 5,515,180 | 5/1996 | Maeda et al. | 358/458 |

FOREIGN PATENT DOCUMENTS

| | | |
|---|---|---|
| 236594 | 9/1987 | European Pat. Off. . |
| 392781 | 10/1990 | European Pat. Off. . |
| 2508747 | 12/1982 | France . |

Primary Examiner—Edward L. Coles, Sr.
Assistant Examiner—Fan Lee
Attorney, Agent, or Firm—Beveridge, DeGrandi, Weilacher & Young, LLP

[57] ABSTRACT

An apparatus for and a method of judging a dotted image area using a small-capacity memory. Image data corresponding to one line out of image data representing an original image are stored in a line memory. On the line corresponding to the image data stored in the line memory, a target pixel is successively set along the main scanning direction. Image data corresponding to the target pixel is compared with image data corresponding to pixels around the target pixel. It is judged whether or not the target pixel is a peculiar point pixel on the basis of the result of the comparison. Further, the distance between peculiar point pixels is operated. The operated distance between the peculiar point pixels is referred to a predetermined judgment basis, to judge whether or not a judging area including the finite number of pixels is a dotted image area.

21 Claims, 19 Drawing Sheets

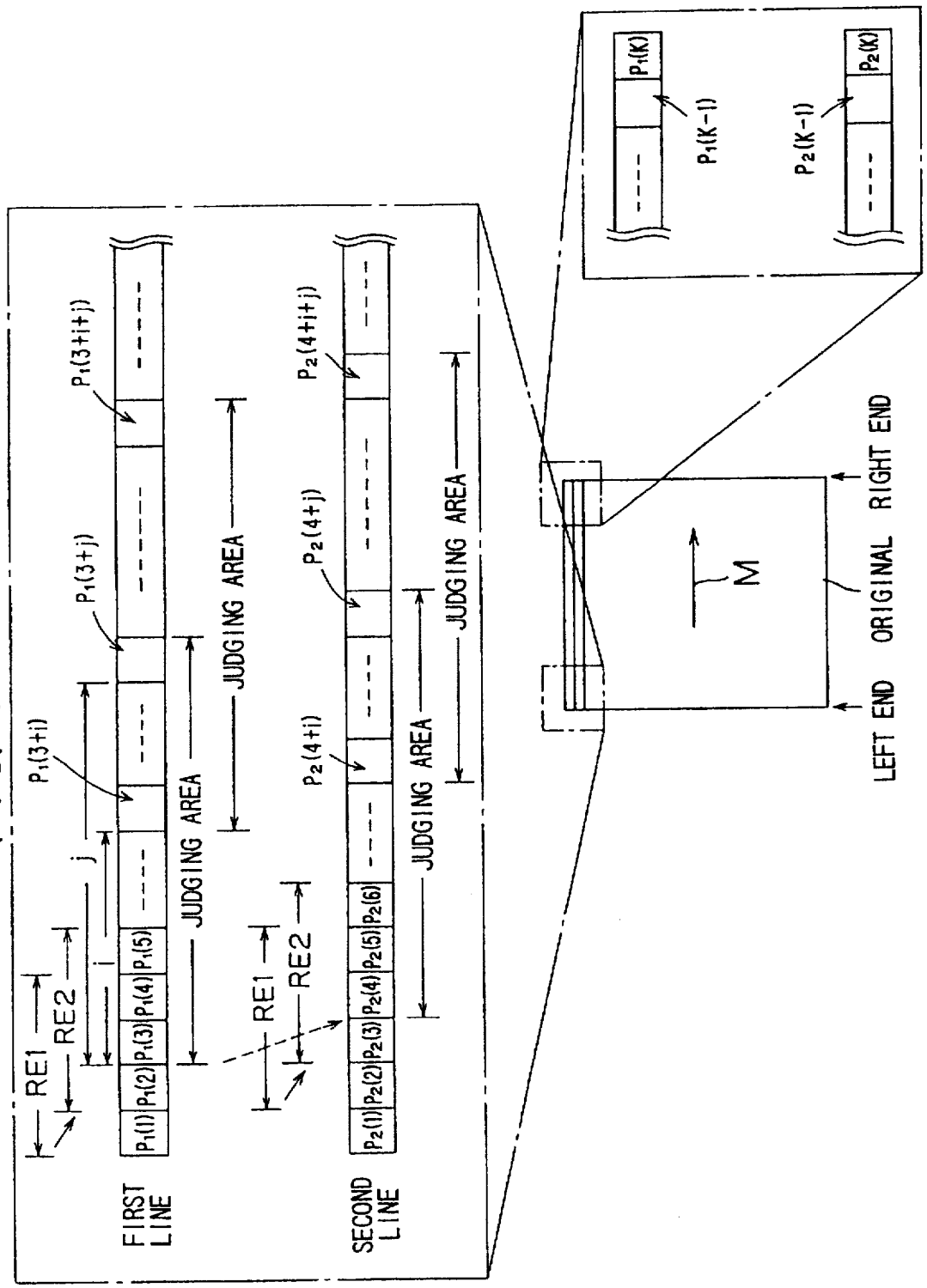

F I G. 12A
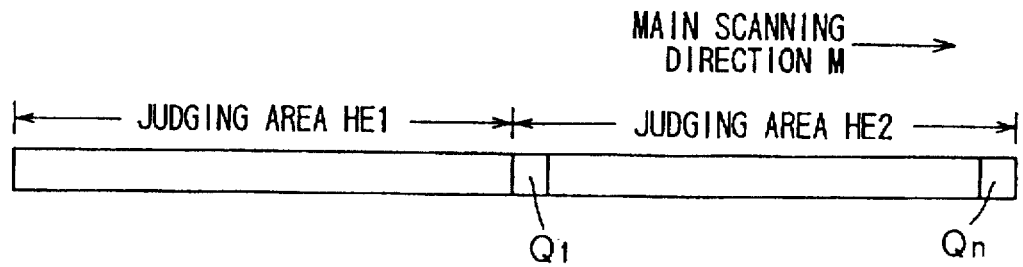
F I G. 12B
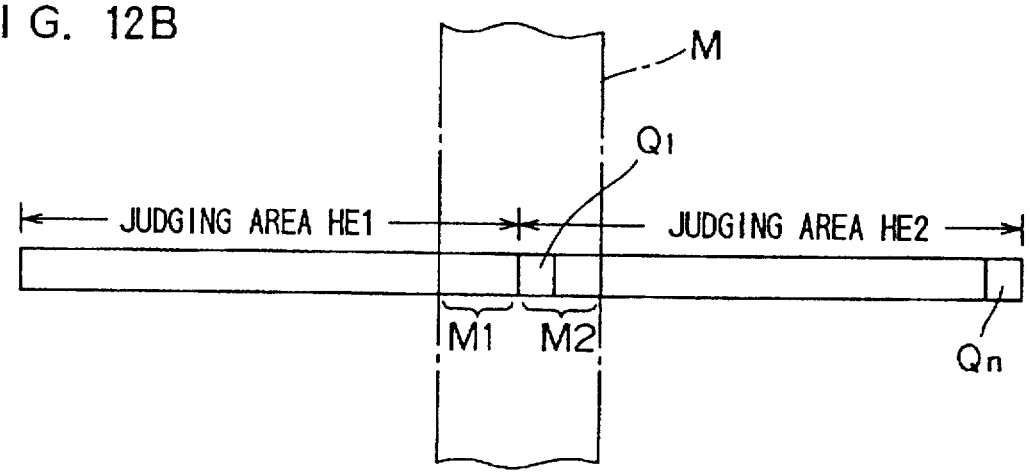
F I G. 12C
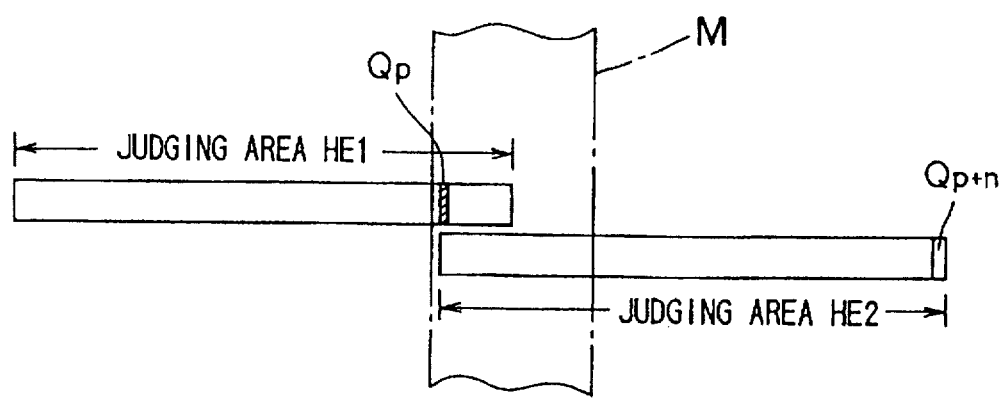

F I G. 13
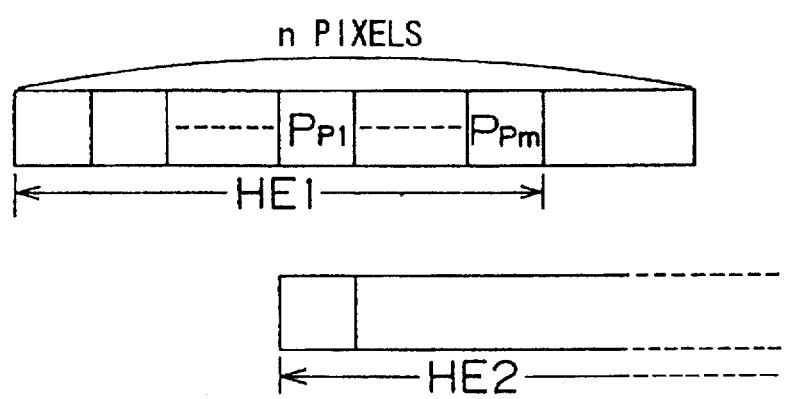

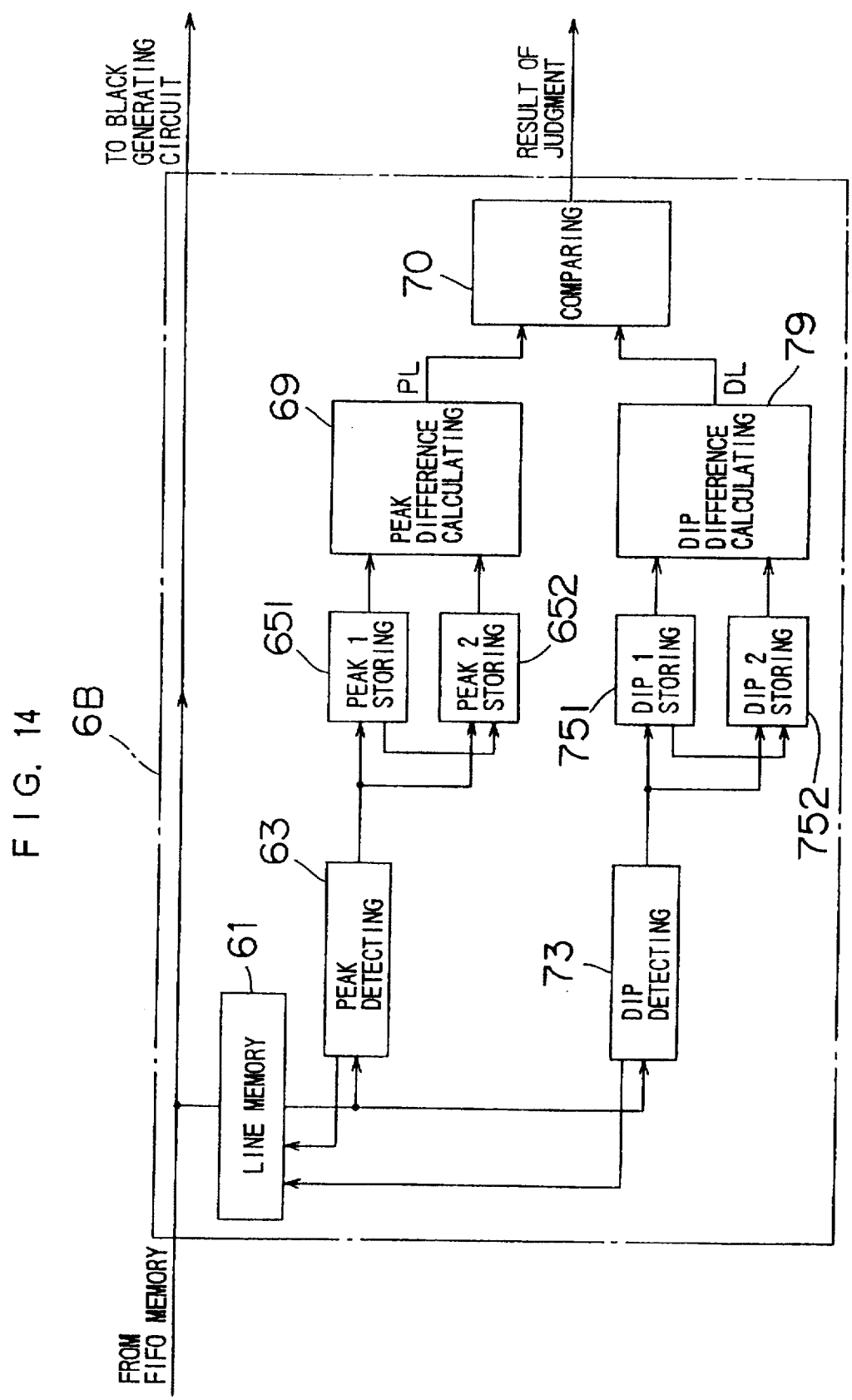

APPARATUS FOR AND METHOD OF JUDGING DOTTED IMAGE AREA

BACKGROUND OF THE INVENTION

1. Field of the Invention

The present invention relates to an apparatus for and a method of judging whether or not each of portions of an original image optically read by a scanner, for example, belongs to a dotted image area.

2. Description of the Related Art

A digital copying machine is provided with a scanner including a photoelectric device such as a CCD (Charge Coupled Device). The scanner reads an original image by one line including a plurality of pixels and outputs image data representing the density of each of the pixels. The original image is reproduced on the basis of the image data.

A character or line image, a picture image and a dotted image may, in some cases, be present as a mixture in an original image. The dotted image is an image represented by dots periodically formed, as in a screen-printed image. The size of each of the dots is changed to larger or smaller, thereby representing a gradation. In order that copies high in quality can be also acquired for the original image in which the plurality of types of images are present as a mixture, it is judged to which of a character or line area, a picture area and a dotted image area belongs each of portions of the original image. Suitable image processing is performed for each area. Specifically, the image processing corresponding to a character or line area includes edge emphasis or emphasis of a black character. In addition, the image processing corresponding to a dotted image area includes smoothing for removing moiré.

The area judgment is made for each judging area of predetermined size. It is judged in the following manner, for example, whether or not the judging area belongs to a dotted image area.

The image data outputted from the scanner are stored in a memory having a storage capacity corresponding to a plurality of lines. Image data corresponding to a plurality of lines (for example, 11 lines) are stored in the memory. The density of a target pixel and the densities of pixels around the target pixel are compared with each other in a detecting area of a predetermined range (for example, three pixels×three lines) centered around the target pixel on the basis of the image data. If the target pixel is relatively denser than the pixels around the target pixel, the target pixel is judged to be a peak pixel. On the other hand, if the target pixel is relatively thinner than the pixels around the target pixel, the target pixel is judged to be a dip pixel. The respective pixels are successively deemed to be target pixels to repeat the foregoing processing, whereby peak pixels and dip pixels are detected.

In a judging area including a predetermined number of pixels (for example, nine pixels×nine lines) centered around the target pixel, the occurrence pattern of the peak pixels or of the dip pixels or the density of the peak pixels or of the dip pixels is examined. It is judged whether or not the judging area is a dotted image area on the basis of matching between the occurrence pattern and a plurality of mask patterns representing dotted image areas or on the basis of the result of comparison between the density and a predetermined reference value. Specifically, if there exists the mask pattern which coincides with the occurrence pattern or if the density is not less than the reference value, it is judged that the judging area is a dotted image area.

However, a memory having a capacity corresponding to a plurality of lines is indispensable in order to detect the peak pixels or the dip pixels. Therefore, the scale of the memory is increased.

Furthermore, there are various types of dotted images. The number of lines of dots per inch (hereinafter referred to as "ruling") is not constant. Specifically, the ruling of a fine dotted image is approximately 200. On the other hand, the ruling of a coarse dotted image is approximately 65. In an original having a small ruling less than approximately 100, the size of each of the dots constituting the dotted area is liable to be larger than each of pixels detected by the scanner. In such a case, by the above described method of detecting peak pixels or the dip pixels, peak pixels or dip pixels cannot be accurately detected, whereby the peak pixels or the dip pixels may be erroneously detected in many cases.

SUMMARY OF THE INVENTION

An object of the present invention is to provide a dotted image area judging apparatus capable of reducing the scale of a memory.

Another object of the present invention is to provide an apparatus capable of reliably detecting peculiar point pixels (peak pixels or dip pixels) irrespective of the size of each of dots constituting a dotted image area, thereby making it possible to accurately judge whether or not a judging area belongs to a dotted image area.

Still another object of the present invention is to provide a method of judging a dotted image area in which the scale of a memory can be reduced.

A further object of the present invention is to provide a method in which peculiar point pixels can be reliably detected irrespective of the size of each of dots constituting a dotted image area, thereby making it possible to accurately judge whether or not a judging area belongs to a dotted image area.

According to the present invention, an original image is represented by a plurality of lines, each of which includes a plurality of pixels. The density of each pixel is represented by image data. The image data are stored in storing means capable of storing image data corresponding to at least one line. Target pixels are successively set along the main scanning direction on a line corresponding to the image data stored in the storing means. The image data corresponding to the target pixel is compared with the image data corresponding to pixels around the target pixel. It is judged whether or not the target pixel is a peculiar point pixel on the basis of the result of the comparison. In addition, the distance between peculiar point pixels is operated. The operated distance between the peculiar point pixels is compared with a predetermined judgment basis, to judge whether or not a judging area including the finite number of pixels belongs to a dotted image area.

According to the present invention, the peculiar point pixels are detected using the image data corresponding to one line, to judge whether or not the judging area belongs to a dotted image area on the basis of the distance between the peculiar point pixels. Therefore, the necessity for storing means having a capacity corresponding to a plurality of lines is eliminated. Consequently, the scale of the memory can be reduced, as compared with the prior art in which a memory capable of storing image data corresponding to at least a plurality of lines is indispensable in order to judge whether or not a judging area belongs to a dotted image area.

The judging area including the finite number of pixels may be repeatedly set while being successively shifted a predetermined number of pixels at a time in the main scanning direction on one line corresponding to the image data stored in the storing means. In this case, it is judged for each set judging area whether or not the judging area belongs to a dotted image area.

Furthermore, the judging area may be set in such a manner that the first pixel in the first judging area on each of the lines is set while being shifted a predetermined number of pixels at a time in the main scanning direction for each line in a period of a predetermined number of lines. This makes it possible to reliably detect a dotted image area which is relatively short in the main scanning direction and relatively long in the sub-scanning direction at right angles to the main scanning direction, for example, and has a small ruling. The reason for this is that even in a case where the dotted image area only occupies a relatively small portion of a judging area on a certain line, the dotted image area can occupy a relatively large portion of a judging area on any one of the other lines. Therefore, the dotted image area is not overlooked.

Furthermore, the judging area including the finite number of pixels may be repeatedly set while being successively shifted in the main scanning direction on one line corresponding to the image data stored in the storing means. In this case, if at least one peculiar point pixel is detected in one judging area, it is preferable that the succeeding judging area is set by taking as the first pixel the peculiar point pixel which is positioned on the uppermost stream side with respect to the main scanning direction in the judging area. It is judged for each set judging area whether or not the judging area belongs to a dotted image area.

For example, when the dotted image area having a relatively small width in the main scanning direction only occupies a portion of the judging area, there is a possibility that a required number of peculiar point pixels for judging a dotted image area on the basis of the distance between the pixels cannot be detected. Therefore, the dotted image area may be overlooked. When the peculiar point pixel is detected in a certain judging area, the succeeding judging area may be newly set by taking as the first pixel the peculiar point pixel first detected in the judging area. Therefore, in the judging area newly set, the possibility that the required number of peculiar point pixels for judging a dotted image area on the basis of the distance between the pixels detected becomes greater. Therefore, it is possible to prevent the dotted image area from being overlooked.

Furthermore, in detecting the peculiar point pixels, it is preferable that each of the image data corresponding to the two pixels adjacent to the target pixel on the upstream side with respect to the main scanning direction and the image data corresponding to the one pixel adjacent to the target pixel on the downstream side with respect to the main scanning direction are respectively compared with the image data corresponding to the target pixel. As a result, the image data corresponding to the pixels on the same line which are not adjacent to the target pixel are utilized, thereby to make it possible to reliably detect the peculiar point pixels irrespective of the size of each dot and each pixel detected by reading means.

Furthermore, it is preferable that the judgment whether or not the judging area belongs to a dotted image area is made by referring the operated distance between the peculiar point pixels to a predetermined statistical basis to judge whether or not the occurrence of the peculiar point pixels has predetermined periodicity. If the occurrence of the peculiar point pixels has the predetermined periodicity, it can be judged that the judging area is a dotted image area.

It may be judged by detecting the frequency of occurrence of the operated distance between the peculiar point pixels and judging if the ratio of the maximum value of detected frequencies of occurrence to the sum of the frequencies of occurrence is not less than a predetermined ratio whether or not the occurrence of the peculiar point pixels has the predetermined periodicity. If the ratio of the maximum value to the sum of the frequencies of occurrence is not less than a predetermined ratio, it can be judged that the occurrence of the peculiar point pixels has the predetermined periodicity.

The dotted image area is an area composed of periodically arranging dots. Therefore, the occurrence of peak pixels each corresponding to the center of each of the dots and the occurrence of dip pixels each corresponding to the trough between the dots have one-dimensional periodicity. Therefore, the above described construction makes it possible to reliably judge whether or not the judging area belongs to a dotted image area. It is thus judged on the basis of the periodicity of the occurrence if the peculiar point pixels whether or not the judging area belongs to a dotted image area, whereby image data corresponding to a plurality of lines are not necessarily required. For example, a portion of image data based on which it can be judged whether or not the occurrence of the peak pixels or the dip pixels in the image data corresponding to one line has periodicity may be sufficient. Consequently, the scale of the memory can be reduced, as compared with the prior art in which a memory capable of storing image data corresponding to at least a plurality of lines (for example, nine lines) is indispensable in order to judge whether or not a judging area belongs to a dotted image area.

The peculiar point pixels used for the dotted image area judgment may include peak pixels or dip pixels.

Furthermore, both the peak pixels and the dip pixels may be detected as the peculiar point pixels. In this case, on the basis of the respective positions of a pair of peak pixels and a pair of dip pixels which are continuously judged to be the peculiar point pixels, the distance between the pair of peak pixels and the distance between the pair of dip pixels may be operated. It can be judged by operating the difference between the distance between the pair of peak pixels and the distance between the pair of dip pixels and comparing the difference between the distances with a predetermined value whether or not the judging area belongs to a dotted image area. If the difference between the distances is not more than a predetermined value, it can be judged that a continuous area including the pair of peak pixels and the pair of dip pixels belongs to a dotted image area.

Since the dotted image area is an area composed of periodically arranging dots, the peak pixels and the dip pixels alternately appear in the same period unless an original is extremely bright or extremely dark. Consequently, the difference between the distance between the peak pixels and the distance between the dip pixels is not more than a predetermined value, although it is ideally entirely the same. Therefore, the above described construction makes it possible to reliably judge whether or not the judging area belongs to a dotted image area.

Since it is judged whether or not the judging area belongs to a dotted image area on the basis of the similarity of the occurrence of the peak pixels and the occurrence of the dip pixels according to the above described construction, image data corresponding to a plurality of lines are not necessarily required to judge whether or not the judging area belongs to a dotted image area. For example, a portion of image data based on which it can be judged whether or not there is similarity in the occurrence of the peak pixels or the occurrence of the dip pixels in the image data corresponding to one line, for example. Consequently, the scale of the memory can be reduced, as compared with the prior art in which a memory capable of storing image data corresponding to at least a plurality of lines (for example, nine lines) is indispensable in order to judge whether or not a judging area belongs to a dotted image area.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram for explaining judging areas on the first line and the second line of an original image;

FIGS. 12A, 12B and 12C are diagrams for explaining the setting of judging areas;

FIG. 13 is a diagram for explaining another example of the setting of judging areas;

FIG. 14 is a block diagram for explaining the flow of dotted image area judging processing according to a third embodiment;

DESCRIPTION OF THE PREFERRED EMBODIMENTS

Figure 1:
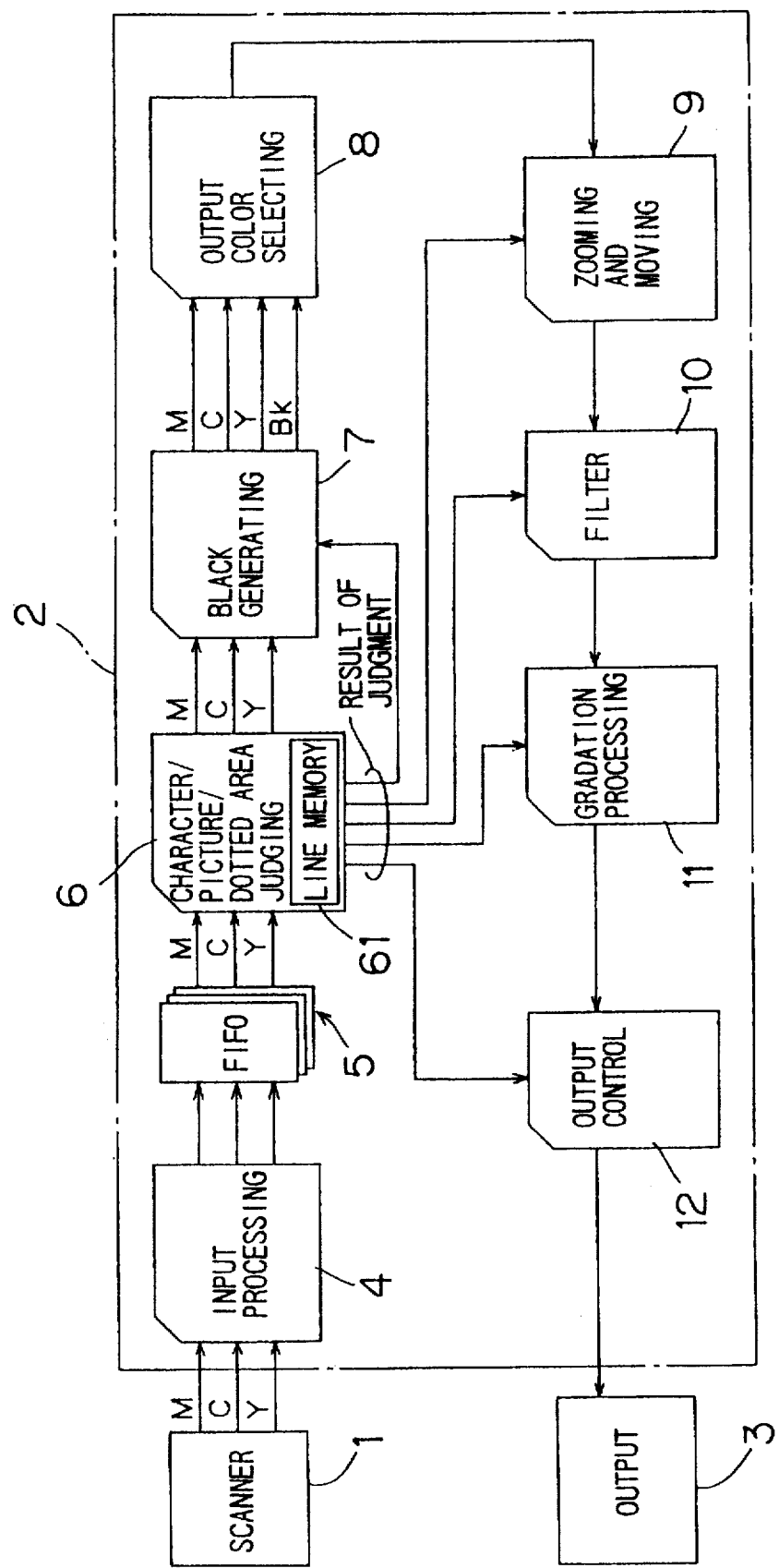
FIG. 1 is a block diagram showing the electrical construction of a principal part of a digital color copying machine to which a dotted image area judging apparatus according to one embodiment of the present invention is applied.

FIG. 1 is a block diagram showing the electrical construction of a principal part of a digital color copying machine to which a dotted image area judging apparatus according to a first embodiment of the present invention is applied.

The digital color copying machine comprises a scanner 1 for optically reading a color original image to be copied. The scanner 1 photoelectrically converts the original image by one line including a plurality of pixels, to produce image data representing the densities of the three primary colors (additive), that is, red (R), green (G) and blue (B) for each pixel. The scanner 1 further converts the image data representing the densities of the three primary colors, that is, R, G and B into image data representing the densities of the three primary colors (subtractive), that is, yellow (Y), magenta (M) and cyan (C) which are their respective complementary colors and outputs the image data. The resolution of the scanner 1 is approximately 400 pixels per inch, for example.

The image data of Y, M and C which are produced by the scanner 1 respectively correspond to the densities of the pixels. The image data of each of the colors is composed of $\beta$ bits and is represented at $2^{62}$ gradation levels. For example, when $\beta=8$, the density of each of the pixels is represented at 256 gradation levels for each color.

The digital color copying machine further comprises an image processing circuit 2 for subjecting the image data of Y, M and C outputted from the scanner 1 to various processing and an output section 3 for reproducing the original image on a paper sheet. The output section 3 may be an image forming section of an electrophotographic type comprising a photoreceptor, an exposing light source such as a laser beam scanning unit for selectively exposing the surface of the photoreceptor to form an electrostatic latent image, and a developing device for developing the electrostatic latent image into a toner image.

The image processing circuit 2 comprises an input processing circuit 4. The image data of Y, M and C which are produced by the scanner 1 are fed to the input processing circuit 4. The input processing circuit 4 performs processing such as clock conversion for canceling the difference in clocks between the scanner 1 and the image processing circuit 2. The image data of Y, M and C outputted from the input processing circuit 4 are fed to an FIFO (First In First Out) memory 5.

The image data corresponding to arbitrary one line out of the image data of Y, M and C which are fed to the FIFO memory 5 are stored in a line memory 61 provided in a character/picture/dotted area judging circuit 6. The line memory 61 functions as storing means capable of storing the image data corresponding to one line. The character/picture/dotted area judging circuit 6 judges to which of a character or line area, a picture area and a dotted image area belongs a portion of image represented by the image data stored in the line memory 61. The dotted image area is an area where a halftone image, for example, is formed by dots periodically formed. The size of each of the dots is set to various values, thereby representing a gradation image. The result of the judgment is given to a black generating circuit 7, a zooming and moving circuit 9, a filter circuit 10, a gradation level processing circuit 11 and an output control circuit 12.

The image data stored in the FIFO memory 5 is also given to the black generating circuit 7 through the character/picture/dotted area judging circuit 6. The black generating circuit 7 generates black (BK) data for compensating for insufficient density in a high density portion. Specifically, a value obtained by multiplying the minimum value among the image data of Y, M and C by a correction factor $\gamma$ (for example, $\gamma=0.5$ to 1), for example, is subtracted from the image data of each color, and the subtracted value is taken as BK data. The image data Y, M and C and the BK data are fed to an output color selecting circuit 8.

The output color selecting circuit 8 selects the image data corresponding to any one of colors of Y, M, C and BK. The selected image data is fed to the zooming and moving circuit 9, where the image data is subjected to processing such as enlargement or reduction depending on the set magnification. The image data processed by the zooming and moving circuit 9 is fed to the filter circuit 10. The filter circuit 10 subjects the image data to smoothing processing or edge emphasizing processing depending on the result of the judgment given from the character/picture/dotted area judging circuit 6. The image data processed by the filter circuit 10 is fed to the gradation level processing circuit 11. The gradation level processing circuit 11 subjects the image data to halftone image processing such as so-called dither processing or multivalued dither processing.

The image data which has been subjected to the halftone image processing is subjected to required processing by the output control circuit 12, after which the image data is fed to the output section 3.

Figure 2:
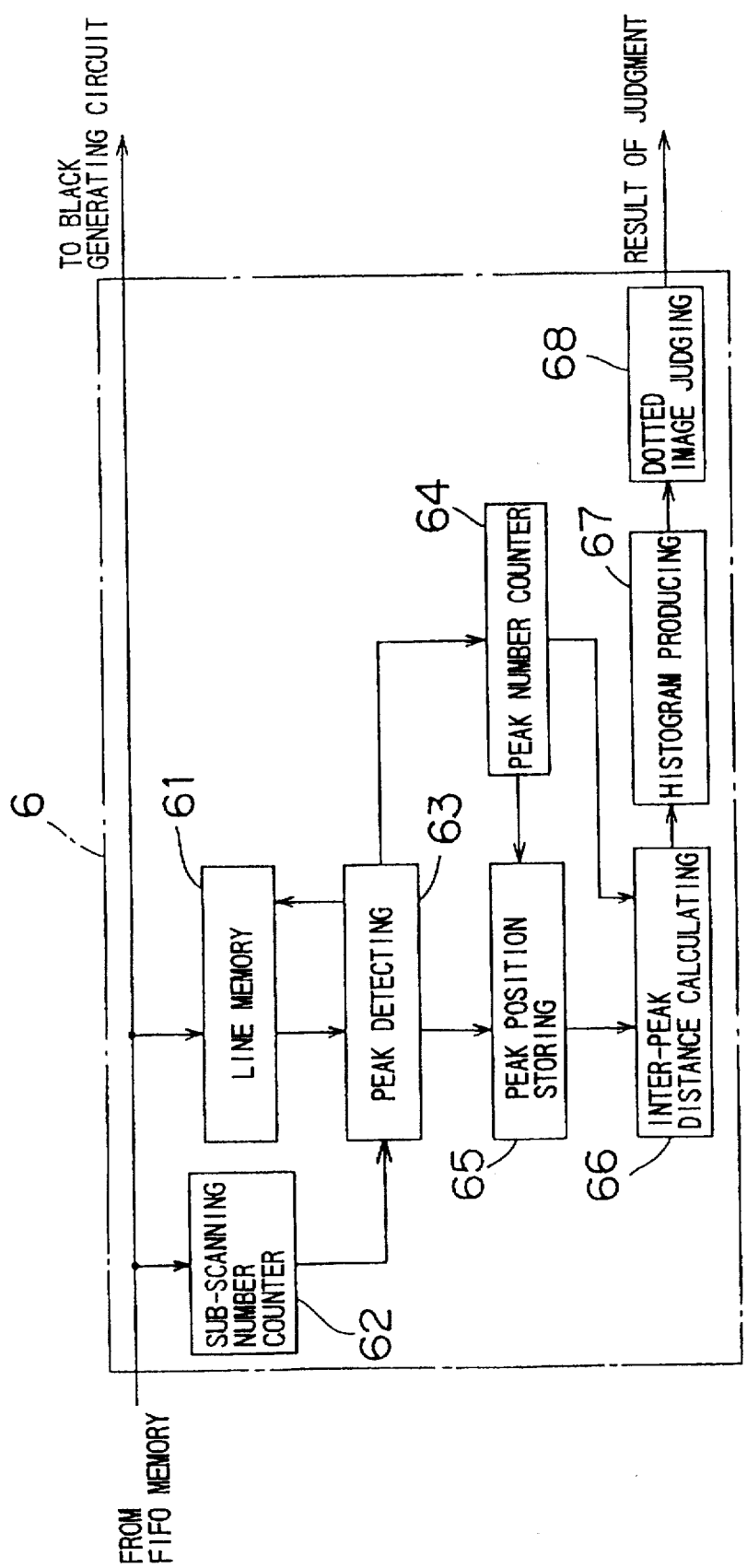
FIG. 2 is a block diagram for explaining the flow of dotted image area judging processing according to a first embodiment.

FIG. 2 is a block diagram showing the flow of dotted image area judging processing in the character/picture/ dotted area judging circuit 6. The character/picture/dotted area judging circuit 6 includes a line memory 61 for storing image data corresponding to at least one line out of image data in any one of colors of Y, M and C, as described above. The character/picture/dotted area judging circuit 6 further includes a sub-scanning number counter 62 and a peak detecting section 63.

The sub-scanning number counter 62 increments a count value C1 every time the image data corresponding to one line are fed from the FIFO memory 5 to the line memory 61. The count value C1 is cleared every time it becomes a predetermined value α (for example, α=9). The count value C1 is given to the peak detecting section 63 for detecting a peak pixel. The peak pixel is a pixel to be the center of each of dots constituting a dotted image area.

Figure 2A:
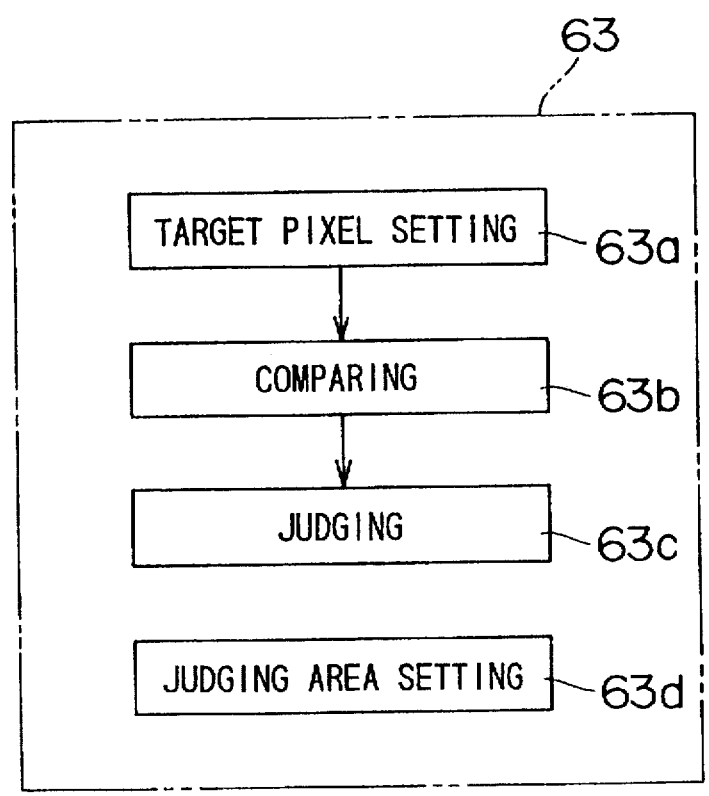
FIG. 2A is a block diagram for explaining the functional features of a peak detecting section.

As shown in FIG. 2A, the peak detecting section 63 includes a target pixel setting means 63a, a comparing means 63b, a judging means 63c and a judging area setting means 63d. The target pixel setting means 63a successively sets a target pixel along the line of which image data is stored in the line memory 61. The comparing means 63b compares the image data of the target pixel with image data of pixels around the target pixel is a peak pixel on the basis of the result of the comparison. The judging area setting means 63d repeatedly sets a judging area including the finite number of pixels. The judging area is to be judged whether or not it belongs to a dotted image area.

Description is made of the operation of the character/ picture/dotted area judging circuit 6 in a case where image data corresponding to the first line of an original image are stored in the line memory 61 (the count value C1=1). The peak detecting section 63 reads from the line memory 61 image data $D_1(1)$, $D_1(2)$, $D_1(3)$ and $D_1(4)$ respectively corresponding to first continuous four pixels $P_1(1)$, $P_1(2)$, $P_1(3)$ and $P_1(4)$ on the first line (corresponding to a reading range RE1 shown in FIG. 3). At this time, the pixel $P_1(3)$ is a target pixel. It is judged on the basis of the image data $D_1(1)$ to $D_1(4)$ whether or not the pixel $P_1(3)$ taken as a target pixel is a peak pixel. Specifically, it is judged whether or not all conditions indicated by the following expressions (1), (2) and (3) are satisfied:

$$D_1(3)-D_1(1)>d_{TH1} \text{ or } D_1(3)-D_1(2)>d_{TH2} \quad (1)$$

$$D_1(3) \geq D_1(4) \quad (2)$$

$$D_1(3)>d_{TH3} \quad (3)$$

If all the conditions indicated by the foregoing expressions (1), (2) and (3) hold, it is considered that the density of the target pixel $P_1(3)$ is relatively higher than those of the pixels $P_1(1)$, $P_1(2)$ and $P_1(4)$ around the target pixel $P_1(3)$. That is, the pixel $P_1(3)$ is detected as a peak pixel.

It is not judged whether or not the two pixels $P_1(1)$ and $P_1(2)$ at the left end of the original image (see FIG. 3) and one pixel $P_1(k)$ at the right end of the original image (see FIG. 3) are peak pixels. However, the merit of accurately judging whether or not pixels in the vicinity of the ends of the original image are pixels constituting a dotted image area is small. Accordingly, there is particularly no problem if the pixels are ignored in peak pixel detecting processing. The reason for this is that no great effect is exerted on a reproduced image even if processing with respect to two or three pixels at the ends of the original image is not suitable.

When the peak pixel detecting processing taking the pixel $P_1(3)$ as a target pixel is terminated, image data $D_1(2)$ to $D_1(5)$ respectively corresponding to pixels $P_1(2)$ to $P_1(5)$ (corresponding to a reading range RE2 shown in FIG. 3) are read from the line memory 61. At this time, the pixel $P_1(4)$ becomes a target pixel. The same processing as the foregoing is performed.

Such peak pixel detecting processing is repeated until the number of pixels taken as target pixels becomes a predetermined value j (for example, j=48), and is terminated once.

An area including all j pixels taken as target pixels shall be referred to as a "judging area". The judging area is a unit area in judging whether or not each of portions of the original image belongs to a dotted image area.

In the condition indicated by the foregoing expression (1), the image data $D_1(1)$ corresponding to the pixel $P_1(1)$ spaced one pixel from the target pixel $P_1(3)$ is used in addition to the pixels $P_1(2)$ and $P_1(4)$ adjacent to the target pixel $P_1(3)$. The reason for this is that a case where the size of each of the dots constituting a dotted image area is large enough to stick out each of pixels detected by the scanner 1 is considered.

Figure 4:
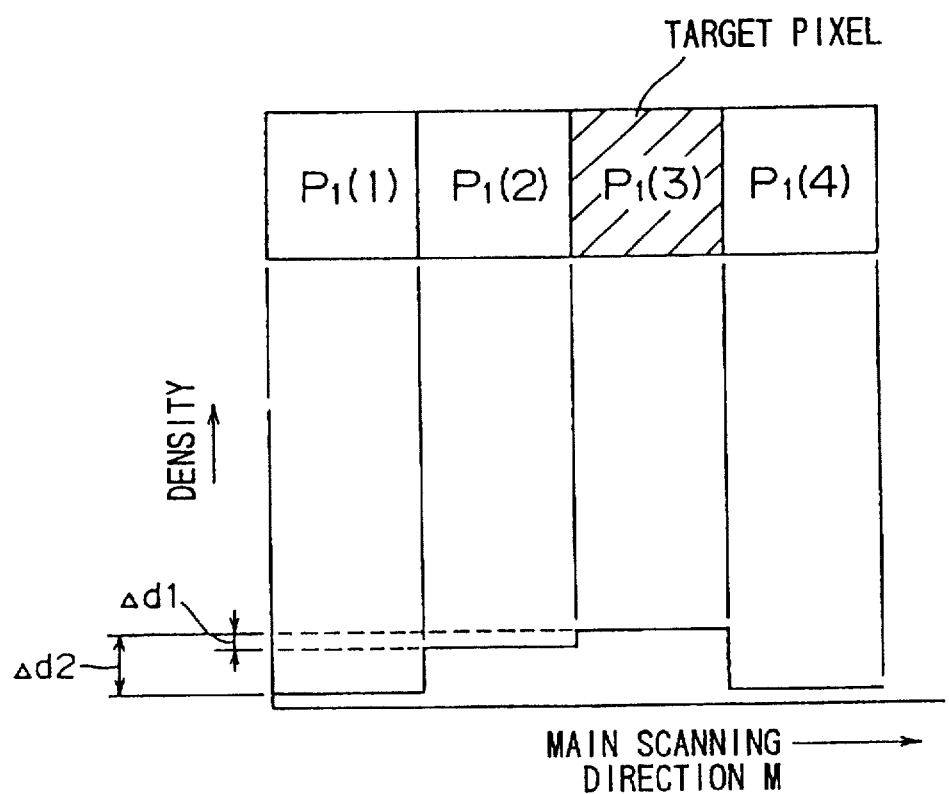
FIG. 4 is a diagram for explaining peak pixel detecting processing.
Figure 5:
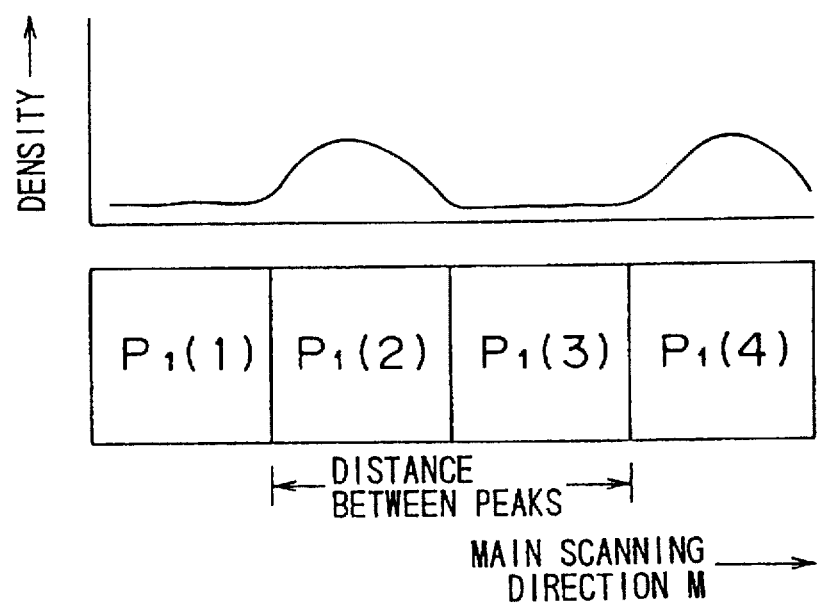
FIG. 5 is a diagram for explaining a method of finding the distance between peaks.

The foregoing will be described more specifically. For example, suppose a case where each of the dots almost ranges over the four pixels detected by the scanner 1 (that is, the ruling of the dotted image area is approximately 50), and the center of a dot is on the target pixel $P_1(3)$. In this case, there is only a relatively small difference Δd1 between the image data $D_1(3)$ corresponding to the pixel $P_1(3)$ and the image data $D_1(2)$ corresponding to the pixel $P_1(2)$ adjacent to the pixel $P_1(3)$, as shown in FIG. 4, for example. On the other hand, there is a relatively large difference Δd2 between the image data $D_1(3)$ corresponding to the pixel $P_1(3)$ and the image data $D_1(1)$ corresponding to the pixel $P_1(1)$. If only the image data $D_1(2)$ and $D_1(4)$ respectively corresponding to the pixels $P_1(2)$ and $P_1(4)$ adjacent to the pixel $P_1(3)$ are utilized, there is a possibility that the pixel $P_1(3)$ cannot be detected as a peak pixel. This problem is overcome by utilizing the image data $D_1(1)$ corresponding to the pixel $P_1(1)$ spaced one pixel from the pixel $P_1(3)$ in addition to the image data $D_1(2)$ and $D_1(4)$.

In the present embodiment, even if the size of each of the dots is larger than that of each of the pixels detected by the scanner 1, the peak pixel can be reliably detected.

In detecting the peak pixel, image data corresponding to a pixel spaced δ (for example, δ=2, 3) pixels from a target pixel may be utilized instead of utilizing image data corresponding to a pixel spaced one pixel from the target pixel.

Returning to FIG. 2, the peak detecting section 63 feeds a detection signal to a peak number counter 64 in response to the judgment that the target pixel is a peak pixel. The peak number counter 64 increments a count number C2 representing the number of peaks every time the detection signal is fed. When it is judged that the target pixel is a peak pixel, the peak detecting section 63 feeds the position of the target pixel to a peak position storing section 65. The peak position storing section 65 stores the position of the peak pixel. The peak detecting section 63 further feeds a termination signal to the peak position storing section 65 when the peak pixel detecting processing is terminated.

The peak position storing section 65 reads the count value C2 representing the number of peaks from the peak number counter 64 in response to the termination signal being fed thereto. The peak position storing section 65 judges whether or not the number of peaks is not less than a predetermined value m (for example, m=3). As a result, if it is judged that the number of peaks is not less than the predetermined value m, the positions of all peak pixels stored are fed to an inter-peak distance calculating section 66 in order to judge whether or not the dots have periodicity. On the other hand, if it is judged that the number of peaks is less than the predetermined value m, the possibility that the judging area belongs to a dotted image area is considered to be low. Therefore, after the stored positions of all the peak pixels are erased, the program proceeds to dotted image area judging processing for the succeeding judging area. At this time, the count number C2 of the peak number counter 64 is cleared.

In the inter-peak distance calculating section 66, the distance between the adjacent peak pixels is calculated. For example, the distance between the pixel $P_1(2)$ detected as a peak pixel and the pixel $P_1(4)$ subsequently detected as a peak pixel is calculated. The result of the calculation is "2". The calculated distance between peaks is fed to a histogram producing section 67.

Figure 6:
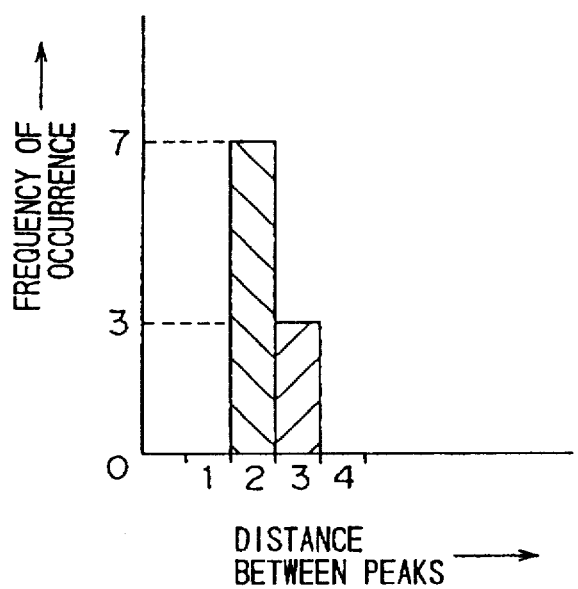
FIG. 6 is a diagram showing one example of a histogram of the distance between peaks.

In the histogram producing section 67, a histogram representing the frequency of occurrence of the distance between peaks is produced. One example of the histogram is illustrated in FIG. 6. In this example, the frequency of occurrence of the distance between peaks "2" is seven times, and the frequency of occurrence of the distance between peaks "3" is three times. Information representing the produced histogram is given to a dotted image judging section 68.

In the dotted image judging section 68, the maximum value in the histogram is extracted. That is, the maximum value of frequencies of occurrence is found out. It is judged whether or not the maximum value is not less than x % of the sum of the frequencies of occurrence. As a result, when it is judged that the maximum value is not less than x % of the sum of the frequencies of occurrence, the judging area is judged to belong to a dotted image area. For example, it is preferable the x is set to 75. If x is set in the range of $65 \leq x \leq 85$, the judgment can be accurately made.

Where the above predetermined value m equals to 3 and the resolution of the scanner is 400 pixels per inch, if the period of pixels detected by the scanner differs from the period of dots, each of inter-peak distances is likely to take a value which is different by 1 from that of the adjacent pair of peaks. There may thus often occur the cases, where the maximum value of frequencies of occurrence is around 66%. The lower limit of x, 65%, is set in view of such circumstance. The upper limit of x, 85%, is set experimentally, above which dotted image areas are hardly detected.

If it is judged in the peak position storing section 65 that the count value C2 of the peak number counter 64 is less than the predetermined value m, or judging processing in the dotted image judging section 68 is terminated, the same dotted image area judging processing as the foregoing is performed for the succeeding judging area.

The succeeding judging area is set as shown in FIG. 3 irrespective of whether or not a peak pixel is detected in the preceding judging area. Specifically, the succeeding judging area is so set that a pixel $P_1(3+i)$ shifted by i (for example, i=16, i<j) pixels in the main scanning direction M from the pixel $P_1(3)$ which is first judged to be a peak pixel in the preceding judging area becomes a judgment starting pixel. That is, a new judging area is an area from the judgment starting pixel $P_1(3+i)$ to a pixel $P_1(3+i+j)$ which is shifted therefrom by j pixels in the main scanning direction M.

The reason why the judging area is thus set will be described.

Figure 7A:
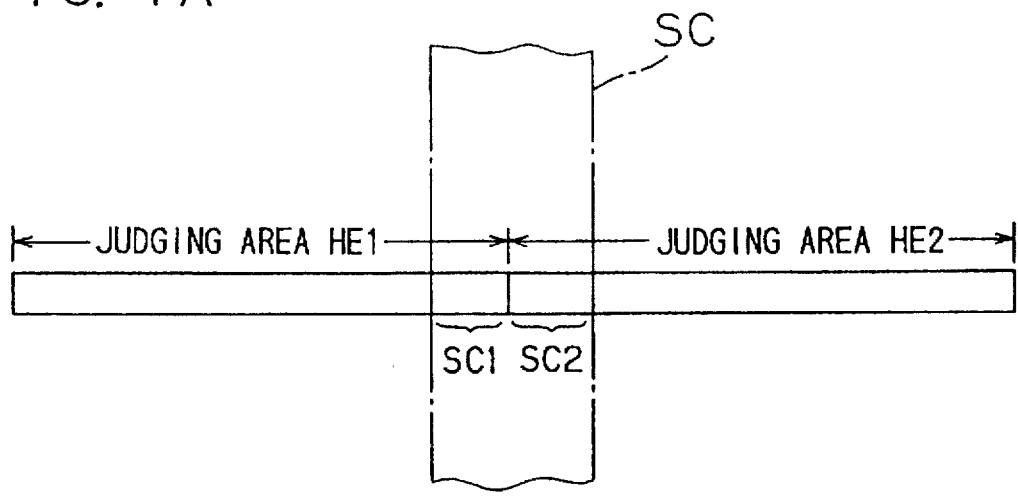
FIGS. 7A and 7B are diagrams for explaining a method of setting judging areas on one line.

For example, suppose a case where a dotted image area SC is slightly overlapped with the preceding judging area HE1 and the succeeding judging area HE2, as shown in FIG. 7A. In this case, the number of peak pixels detected in each of the judging areas HE1 and HE2 may be less than the predetermined value m. As a result, it is erroneously judged that the judging areas HE1 and HE2 are not dotted image areas irrespective of the fact that areas SC1 and SC2 which are portions of the judging areas HE1 and HE2 belong to the dotted image area SC.

Figure 7B:
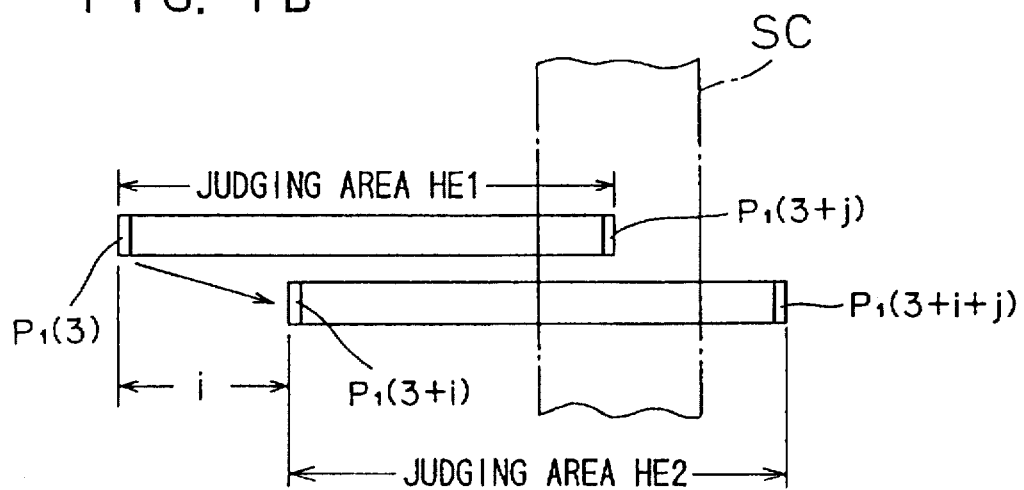

On the other hand, in the present embodiment, a pixel $P_1(3+i)$ which is shifted by i pixels in the main scanning direction M from a judgment starting pixel $P_1(3)$ in a judging area HE1 and a pixel $P_1(3+i+j)$ which is shifted therefrom by j pixels in the main scanning direction M are respectively taken as a judgment starting pixel and a judging terminating pixel in a judging area HE2, as shown in FIG. 7B. In this case, the possibility that the number of peak pixels detected in the judging area HE2 is not less than the predetermined value m is great.

The new judging area HE2 is thus set by shifting the judging area HE1 by the distance corresponding to i pixels shorter than the length of the judging area (j pixels), thereby suitably judging whether or not the judging area belongs to a dotted image area.

After dotted image area judging processing in the judging area H2 newly set is terminated, the judging area is updated in the same manner as described above, whereby the dotted image area judging processing is repeated.

When a judging area is to be set in the vicinity of the right end of the original image, a judging area including j pixels cannot be set in some cases. In such a case, an area including pixels which are less than j pixels up to a pixel $P_1(k-1)$ which is the second pixel from the right end of the original image (see FIG. 3) is set as a judging area. The reason for this is that peak pixel detecting processing requires image data corresponding to pixels adjacent to a target pixel in the main scanning direction, as described above, whereby it is not judged whether or not the pixel $P_1(k)$ at the right end of the original image (see FIG. 3) is a peak pixel.

The dotted image area judging processing is repeatedly performed while updating the judging area. When the dotted image area judging processing in the judging area set at the rightmost end of the original image is terminated, the dotted image area judging processing for the image data on the first line which are stored in the line memory 61 is terminated.

When the dotted image area judging processing for the image data on the first line is terminated, image data on the second line are accepted in the line memory 61 from the FIFO memory 5. At this time, the count value C1 of the sub-scanning number counter 62 is "2".

The dotted image area judging processing for the image data on the second line slightly differs from the judging processing for the image data on the first line. Specifically, a judging processing starting pixel is shifted by one pixel in the main scanning direction M. The number of pixels by which the judging processing starting pixel is to be shifted in the main scanning direction M may be an arbitrary number of pixels w which is not less than two and less than i.

The dotted image area judging processing on the second line will be described more specifically. The judging processing starting pixel on the second line is a pixel $P_2(4)$ which is shifted by one pixel in the main scanning direction M from the judging processing starting pixel $P_1(3)$ on the first line. In order to perform peak pixel detecting processing, therefore, image data $D_2(2)$, $D_2(3)$, $D_2(4)$ and $D_2(5)$ respectively corresponding to pixels $P_2(2)$, $P_2(3)$, $P_2(4)$ and $P_2(5)$ (corresponding to a reading range RE1 on the second line in FIG. 3) are read from the line memory 61. The subsequent processing is the same as the processing on the first line.

Figure 8:
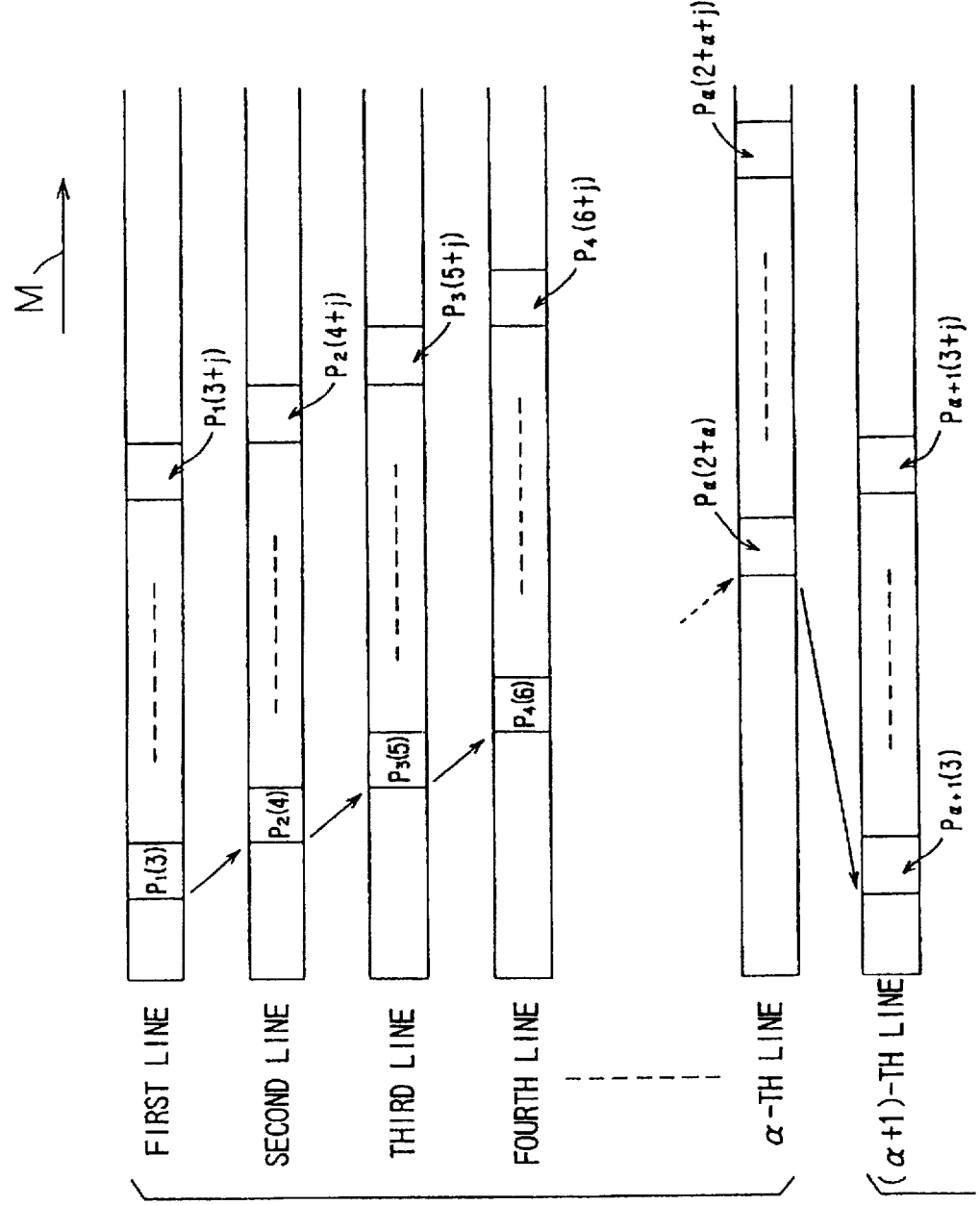
FIG. 8 is a diagram for explaining a method of setting judging areas in the sub-scanning direction.

As shown in FIG. 8, every time a line to be subjected to dotted image area judging processing is shifted to the third line (the count value C1 of the sub-scanning number counter 62 is 3), the fourth line (the count value C1=4), ..., the α-th line (the count value C1=α), the judging processing starting pixel is shifted by one pixel or w (which is not less than two nor more than i) pixels in the main scanning direction M from the judging processing starting pixel on a line preceding the current line. Consequently, on the α-th line, the judging processing starting pixel becomes a pixel $P_α(2+α)$ which is shifted by a pixels in the main scanning direction M from the judging processing starting pixel on the first line.

When the dotted image area judging processing on the α-th line is terminated, the count value C1 of the sub-scanning number counter 62 is cleared in response to the termination. Consequently, on the (α+1)-th line (the count value C1 of the sub-scanning number counter 62 is 1), the judging processing starting pixel is to be a pixel $P_{α+1}(3)$ in the same position as that on the first line again. In the present embodiment, the judging processing starting pixel is thus successively shifted one pixel at a time in the main scanning direction M for each line in a period of α lines.

When the above described dotted image area judging processing has been repeated up to the final line and has been further performed with respect to image data in all colors, all dotted image area judging processing is terminated.

As described in the foregoing, according to the present embodiment, it is judged utilizing the periodicity of the occurrence of peak pixels whether or not a judging area belongs to a dotted image area. Therefore, the line memory 61, in which image data required to judge whether or not a judging area belongs to a dotted image area are to be stored, need not have a capacity corresponding to a plurality of lines. Consequently, the scale of the memory can be reduced, as compared with the prior art in which a memory having a capacity corresponding to a plurality of lines for judging whether or not a judging area belongs to a dotted image area is required.

Furthermore, in the dotted image area judging processing, the judging processing starting pixel is shifted by one pixel at a time in the main scanning direction M for each line in a period of α lines. Consequently, it can be judged that a dotted image area which is relatively short in the main scanning direction M and relatively long in the sub-scanning direction (a direction perpendicular to the main scanning direction M) and has a small ruling can be reliably judged to be a dotted image area. There is a possibility that it cannot be judged that a lengthwise dotted image area having a small ruling as described above is a dotted image area by only shifting the judging processing starting pixel by i pixels at a time on the same line to set a judging area.

The reason for this will be described with reference to FIGS. 9A and 9B.

For example, suppose a case where a judging processing starting pixel is not shifted between lines, although a judging area is repeatedly set while being shifted by i pixels at a time in the main scanning direction M on the same line. In this case, judging areas on the respective lines are set in entirely the same manner, as shown in FIG. 9A. For example, it is assumed that a lengthwise dotted image area SC which is relatively short in the main scanning direction M and relatively long in the sub-scanning direction S and has a small ruling exists in an original image, as shown in FIG. 9A. Specifically, a relatively small portion of the judging area set in the vicinity of the dotted image area SC on each of the lines is only overlapped with the dotted image area SC. In such a case, in each of the judging areas set in the vicinity of the dotted image area SC on arbitrary lines, the number of pixels detected as peak pixels may be below the predetermined value m. Since the judging areas are similarly set on all the lines, there is a possibility that the dotted image area SC cannot be detected in the judging areas in the vicinity of the dotted image area SC on all the lines in the very worst case.

Figure 9A:
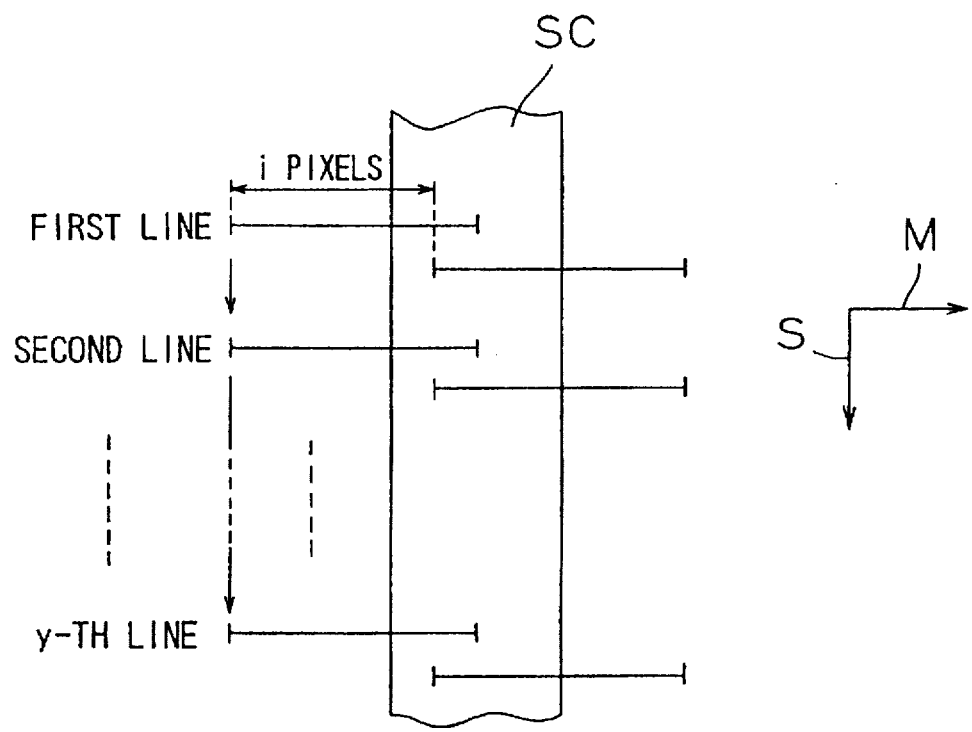
FIGS. 9A and 9B are diagrams for explaining the advantages of a method of setting judging areas in the sub-scanning direction.
Figure 9B:
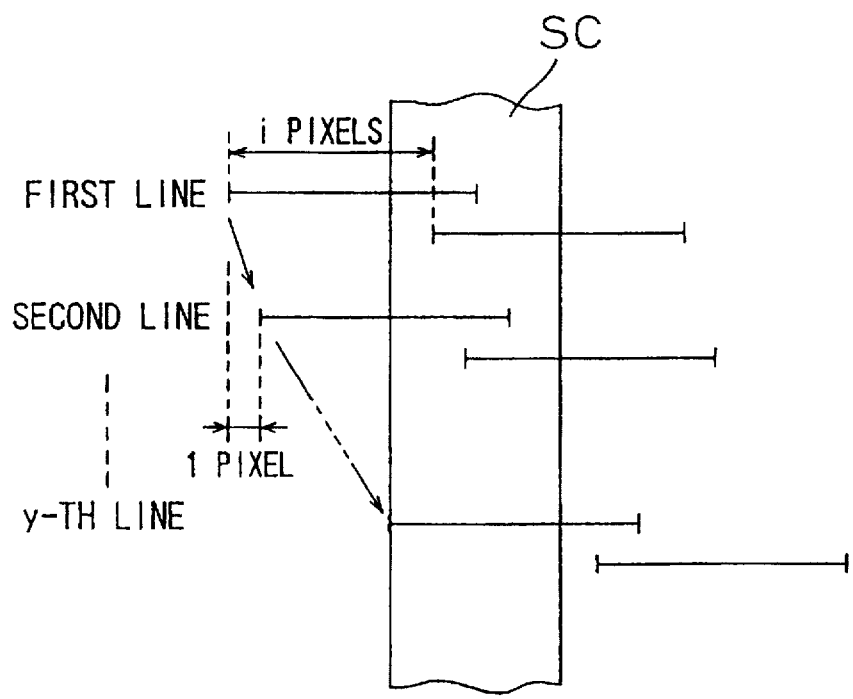

On the other hand, FIG. 9a shows a case where a judging area is repeatedly set while being shifted by i pixels at a time in the main scanning direction M on the same line, and the judging processing starting pixel is shifted by one pixel at a time in the main scanning direction M for each line in a period of α lines. That is, the judging areas on the lines are so set as to be shifted between the lines. Consequently, in the judging area set in the vicinity of the dotted image area SC on any one of the lines, the possibility that the number of pixels detected as peak pixels reaches the predetermined value m becomes greater. Therefore, dotted image areas can be judged more reliably, as compared with the method shown in FIG. 9A.

In this case, only the judging areas in the vicinity of the dotted image area SC on any one or a plurality of lines out of the α lines are judged to belong to a dotted image area. Specifically, it is not judged that all the judging areas set in the vicinity of the dotted image area SC on the α lines belong to a dotted image area. If it is judged that the judging areas on not less than α1 (α1<α) lines out of α lines belong to a dotted image area in an area having a predetermined width extending in the sub-scanning direction, it may be preferably judged that an area in a stripe shape ranging over all the α lines belongs to a dotted image area.

Furthermore, it may be judged in an enlarger manner that a judging area on another line adjacent to the judging area which is judged to belong to a dotted image area also belong to a dotted image area.

Although description has been made of the present embodiment, the present embodiment can be modified as follows. Although in the above described embodiment, it is judged utilizing the periodicity of the occurrence of peak pixels whether or not a judging area belongs to a dotted image area, it may be judged utilizing the periodicity of the occurrence of so-called dip pixels between dots constituting a dotted image area, for example, whether or not a judging area belongs to a dotted image area.

It can be judged whether or not a target pixel is a dip pixel depending on whether or not all conditions indicated by the following expressions (4), (5) and (6) hold:

$$D_1(1)-D_1(3) > d_{TH1} \text{ or } D_1(2)-D_1(3) > d_{TH2} \quad (4)$$

$$D_1(3) \leq D_1(4) \quad (5)$$

$$D_1(4) > d_{TH3} \quad (6)$$

If all the conditions indicated by the foregoing expressions (4), (5) and (6) are satisfied, it is considered that the density of the target pixel $P_1(3)$ is relatively lower than those of the pixels $P_1(1)$, $P_1(2)$ and $P_1(4)$ around the target pixel. It is thus determined that the pixel $P_1(3)$ is a dip pixel between dots constituting a dotted image area.

Furthermore, it may be judged utilizing the periodicity of the occurrence of both peak pixels and dip pixels whether or not a judging area belongs to a dotted image area. In this case, if either one of the occurrence of the peak pixels and the occurrence of the dip pixels has periodicity, it may be judged that the judging area belongs to a dotted image area.

In the above described embodiment, peak pixels or the dip pixels are detected using continuous four pixels in the main scanning direction M. However, peak pixels and dip pixels may be respectively detected by satisfying the following conditions 1 to 6 and 1' to 6', for example.

Figure 10:
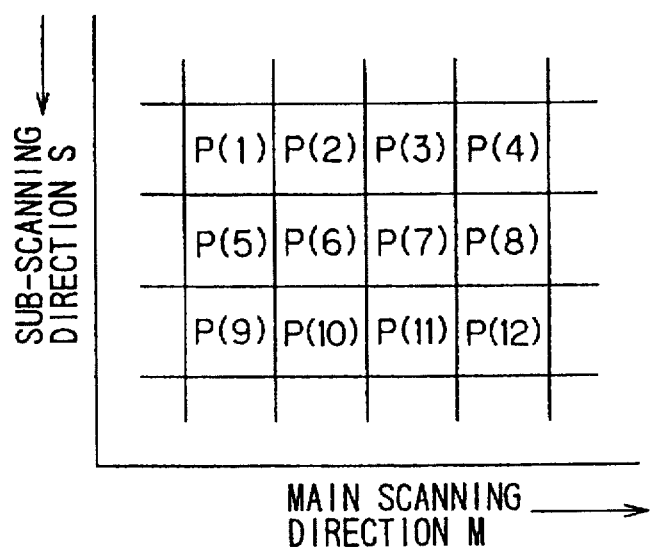
FIG. 10 is a diagram for explaining an example of detecting peak pixels or dip pixels.

The foregoing will be described specifically with reference to FIG. 10. In the following description, D(1) to D(12) are image data respectively corresponding to pixels P(1) to P(12) shown in FIG. 10. The pixel P(7) is a target pixel.

$$D(6) < D(7) \text{ and } D(7) > D(8) \text{ and } D(7) > d_{TH3} \quad \text{Condition 1}$$

$$D(6) > D(7) \text{ and } D(7) < D(8) \text{ and } D(8) > d_{TH3} \quad \text{Condition 1'}$$

If the condition 1 holds, it is judged that the pixel P(7) is a peak pixel. On the other hand, if the condition 1' holds, it is judged that the pixel P(7) is a dip pixel. When the conditions 1 and 1' are applied, peak pixels and dip pixels can be detected more accurately than in a case where the following conditions 3 and 3' are applied.

$$D(6) < D(7) \text{ and } D(7) > D(8) \quad \text{Condition 2}$$

$$D(6) > D(7) \text{ and } D(7) < D(8) \quad \text{Condition 2'}$$

If the condition 2 holds, it is judged that the pixel P(7) is a peak pixel. On the other hand, if the condition 2' holds, it is judged that the pixel P(7) is a dip pixel. If the conditions 2 and 2' are applied, it is possible to detect peak pixels and dip pixels in a dotted image area having a small ruling and in a dotted image area having a large ruling.

$$D(6) < D(7) \text{ and } D(7) \geq D(8) \quad \text{Condition 3}$$

$$D(6) > D(7) \text{ and } D(7) \leq D(8) \quad \text{Condition 3'}$$

If the condition 3 holds, it is judged that the pixel P(7) is a peak pixel. On the other hand, if the condition 3' holds, it is judged that the pixel P(7) is a dip pixel. If the conditions 3 and 3' are applied, it is possible to detect peak pixels and dip pixels in a small-ruling dotted image area more accurately than in a case where the conditions 2 and 2' are applied.

$$D(7) > D(2), \quad \text{Condition 4}$$
$$\text{and } D(7) > D(3),$$
$$\text{and } D(7) > D(4),$$
$$\text{and } D(7) > D(8),$$
$$\text{and } D(7) > D(12),$$
$$\text{and } D(7) > D(11),$$
$$\text{and } D(7) > D(10),$$
$$\text{and } D(7) > D(6),$$

$$D(7) < D(2), \quad \text{Condition 4'}$$
$$\text{and } D(7) < D(3),$$
$$\text{and } D(7) < D(4),$$
$$\text{and } D(7) < D(8),$$
$$\text{and } D(7) < D(12),$$
$$\text{and } D(7) < D(11),$$
$$\text{and } D(7) < D(10),$$
$$\text{and } D(7) < D(6),$$

If the condition 4 holds, it is judged that the pixel P(7) is a peak pixel. On the other hand, if the condition 4' holds, it is judged that the pixel P(7) is a dip pixel. When the conditions 4 and 4' are applied, erroneous detection is reduced. However, it is more difficult to detect peak pixels and dip pixels in a small-ruling dotted image area than in a case where the following conditions 5 and 5' are applied. In addition, a line memory corresponding to three lines is required.

$$D(7) > D(3), \quad \text{Condition 5}$$
$$\text{and } D(7) > D(8),$$
$$\text{and } D(7) > D(11),$$
$$\text{and } D(7) > D(6),$$

$$D(7) < D(3), \quad \text{Condition 5'}$$
$$\text{and } D(7) < D(8),$$
$$\text{and } D(7) < D(11),$$
$$\text{and } D(7) < D(6)$$

If the condition 5 holds, it is judged that the pixel P(7) is a peak pixel. On the other hand, if the condition 5' holds, it is judged that the pixel P(7) is a dip pixel. When the conditions 5 and 5' are applied, it is possible to detect peak pixels and dip pixels in a small-ruling dotted image area more accurately than in a case where the conditions 4 and 4' are applied. However, erroneous detection is increased, as compared with that in a case where the conditions 4 and 4' are applied. In addition, a line memory corresponding to three lines is required.

$$D(7) \geq D(2), \quad \text{Condition 6}$$
$$\text{and } D(7) \geq D(4),$$
$$\text{and } D(7) \geq D(12),$$
$$\text{and } D(7) \geq D(10),$$
$$\text{and } D(7) > D(3),$$
$$\text{and } D(7) > D(8),$$
$$\text{and } D(7) > D(11),$$
$$\text{and } D(7) > D(6),$$

$$D(7) \leq D(2), \quad \text{Condition 6'}$$
$$\text{and } D(7) \leq D(4),$$

and $D(7) \leq D(12)$, and $D(7) \leq D(10)$, and $D(7) < D(3)$, and $D(7) < D(8)$, and $D(7) < D(11)$, and $D(7) < D(6)$ If the condition 6 holds, it is judged that the pixel P(7) is a peak pixel. On the other hand, if the condition 6' holds, it is judged that the pixel P(7) is a dip pixel. When the conditions 6 and 6' are applied, the rate of occurrence of erroneous detection is intermediate between such rate in a case where the conditions 4 and 4' are used and such rate in a case where the conditions 5 and 5' are used. In addition, the detectable ruling range of a dotted image area is intermediate between such range in the case where the conditions 4 and 4' are used and such range in the case where the conditions 5 and 5' are used. A line memory corresponding to three lines is required.

Furthermore, in the above described embodiment, peak pixel detection and dotted image area judgment are performed with respect to each of judging areas including j pixels, after which the program proceeds to processing for the succeeding judging area which is shifted by i pixels. In place of such processing, peak pixel detection may be previously performed over one line, after which dotted image area judgment is made for each judging area.

Figure 11:
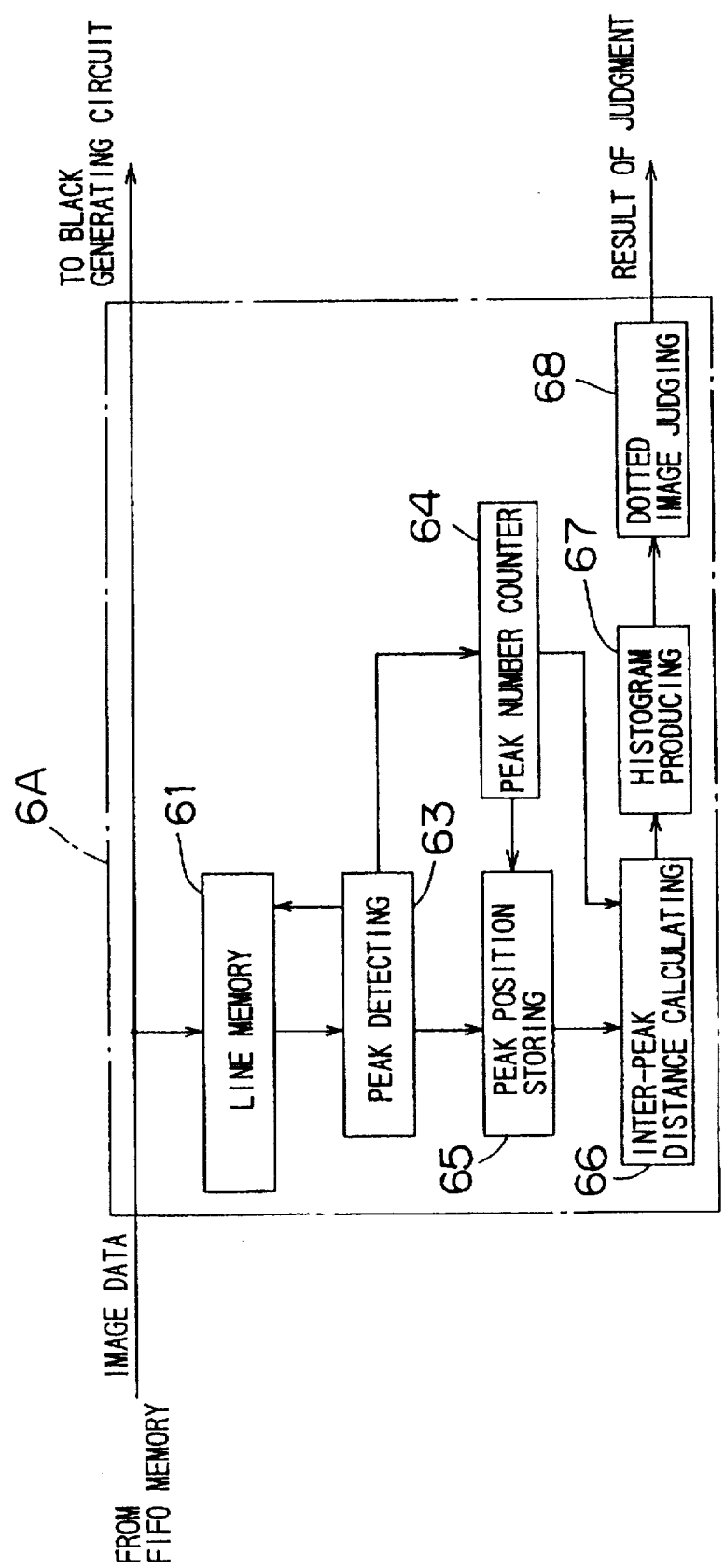
FIG. 11 is a block diagram for explaining the flow of dotted image area judging processing according to a second embodiment.

FIG. 11 is a block diagram for explaining the flow of dotted image area judging processing in a character/picture/dotted area judging circuit 6A, which is to be used in place of the above described character/picture/dotted area judging circuit 6, in a second embodiment of the present invention. In FIG. 11, sections having the same functions as those of the sections shown in FIG. 2 are assigned the same reference numerals. In the description of the present embodiment, FIGS. 1, 3, 6 and 10 will be referred to again.

The character/picture/dotted area judging circuit 6A shown in FIG. 11 differs from the character/picture/dotted area judging circuit 6 shown in FIG. 2 in that the circuit 6A has no sub-scanning counter 62. Specifically, in the present embodiment, processing for shifting a dotted image judgment starting pixel by a predetermined number of pixels at a time for each line in a period of α lines is not performed.

The present embodiment is characterized by a method of updating a judging area. Specifically, when dotted image judging processing for one judging area including n pixels (for example, n=50) is terminated, the succeeding judging area is divided into two depending on whether or not a peak pixel is detected in the preceding judging area.

The foregoing will be described more specifically with reference to FIGS. 12A, 12B and 12C. When no peak pixel is detected in the preceding judging area HE1, a new judging area HE2 is set in a manner as shown in FIG. 12A. That is, the succeeding judging area HE2 is set as a range from a pixel $Q_1$ succeeding the final pixel in the preceding judging area HE1 to a pixel $Q_n$ which is shifted by n pixels in the main scanning direction M from the pixel $Q_1$.

On the other hand, when even one peak pixel is detected in the preceding judging area HE1, a new judging area HE2 is set in a manner as shown in FIG. 12C. That is, the succeeding judging area HE2 is set as a range from a pixel $Q_p$ first detected as a peak pixel in the preceding judging area HE1 to a pixel $Q_{p+n}$ which is shifted by n pixels from the pixel $Q_p$ in the main scanning direction M. Such setting is achieved irrespective of whether or not the number of pixels detected as peak pixels in the preceding judging area HE1 is a predetermined value m (a threshold value for judging whether or not a judging area belongs to a dotted image area).

The reason why the above described updating of the judging area is suitable will be described below.

For example, suppose a case where a dotted image area M is slightly overlapped with the preceding judging area HE1 and the succeeding judging area HE2, as shown in FIG. 12B. In this case, the number of peak pixels detected in each of the judging areas HE1 and HE2 may be less than the predetermined value m. That is, there is a possibility that the judging areas HE1 and HE2 are not judged to belong to dotted image areas irrespective of the fact that areas M1 and M2 which are portions of the judging areas HE1 and HE2 belong to the dotted image area M.

On the other hand, when the pixel $Q_p$ which is first detected as a peak pixel in the judging area HE1 is taken as the first pixel in the judging area HE2, as shown in FIG. 12C, the possibility that the number of pixels detected as peak pixels in the judging area HE2 is not less than the predetermined value m is great. When the number of pixels detected as peak pixels in the preceding judging area is at least one, therefore, the judging area HE2 is set in a manner as shown in FIG. 12C.

There may occur a case where a judging area including n pixels cannot be constructed in the vicinity of the right end of an original image. In this case, a region up to a pixel $P_s(k-1)$ which is the second pixel from the right end of the original image (see FIG. 3, where s is a natural number, indicating how many lines there are before a line to be judged) is taken as a judging area. This is the same as that in the above described first embodiment.

The dotted image area judging processing is thus repeatedly performed while updating the judging area. When the dotted image area judging processing in the judging area set in the vicinity of the right end of the original image has been terminated, dotted image area judging processing for image data of an arbitrary color corresponding to arbitrary one line which are stored in the line memory 61 is terminated. The judgment of a dotted image area is, of course, made in the same manner for image data corresponding to the other lines. Further, the judgment is also made in the same manner for image data in all colors.

The present embodiment may be modified to set a judging area in the following manner. Specifically, when the number of pixels detected as peak pixels reaches the predetermined value m, for example, a target pixel at that time may be taken as the final pixel. In this case, there will be various sizes of judging area.

More specifically, it is assumed that m peak pixels ($P_{p1}$ to $P_{pm}$) are detected before the number of pixels subjected to the peak pixel judgment reaches n, as shown in FIG. 13, for example. In this case, a target pixel in a case where the m-th peak pixel $P_{pm}$ has been detected is taken as the final pixel in a judging area HE1. The succeeding judging area HE2 is set by taking as the first pixel the peak pixel $P_{p1}$ first detected in the preceding judging area HE1.

Furthermore, judging area updating processing according to the present embodiment and judging area updating processing according to the first embodiment can be used together. That is, the position of the first pixel in the first judging area may be shifted by one pixel or a plurality of pixels at a time for each line in a period of α lines.

FIG. 14 is a block diagram for explaining the flow of dotted image area judging processing in a character/picture/ dotted area judging circuit 6B, which is to be used in place of the above described character/picture/dotted area judging circuit 6, in a third embodiment of the present invention. In FIG. 14, sections having the same functions as those of the sections shown in FIG. 2 are assigned the same reference numerals. In the description of the present embodiment, FIGS. 1, 3 to 6 and 10 will be also referred to.

In the present embodiment, the character/picture/dotted area judging circuit 6B comprises a dip detecting section 73 in addition to a peak detecting section 63. The dip detecting section 73 judges that a target pixel is a dip pixel when all the conditions indicated by the foregoing expressions (4), (5)and (6) are satisfied.

Figure 15:
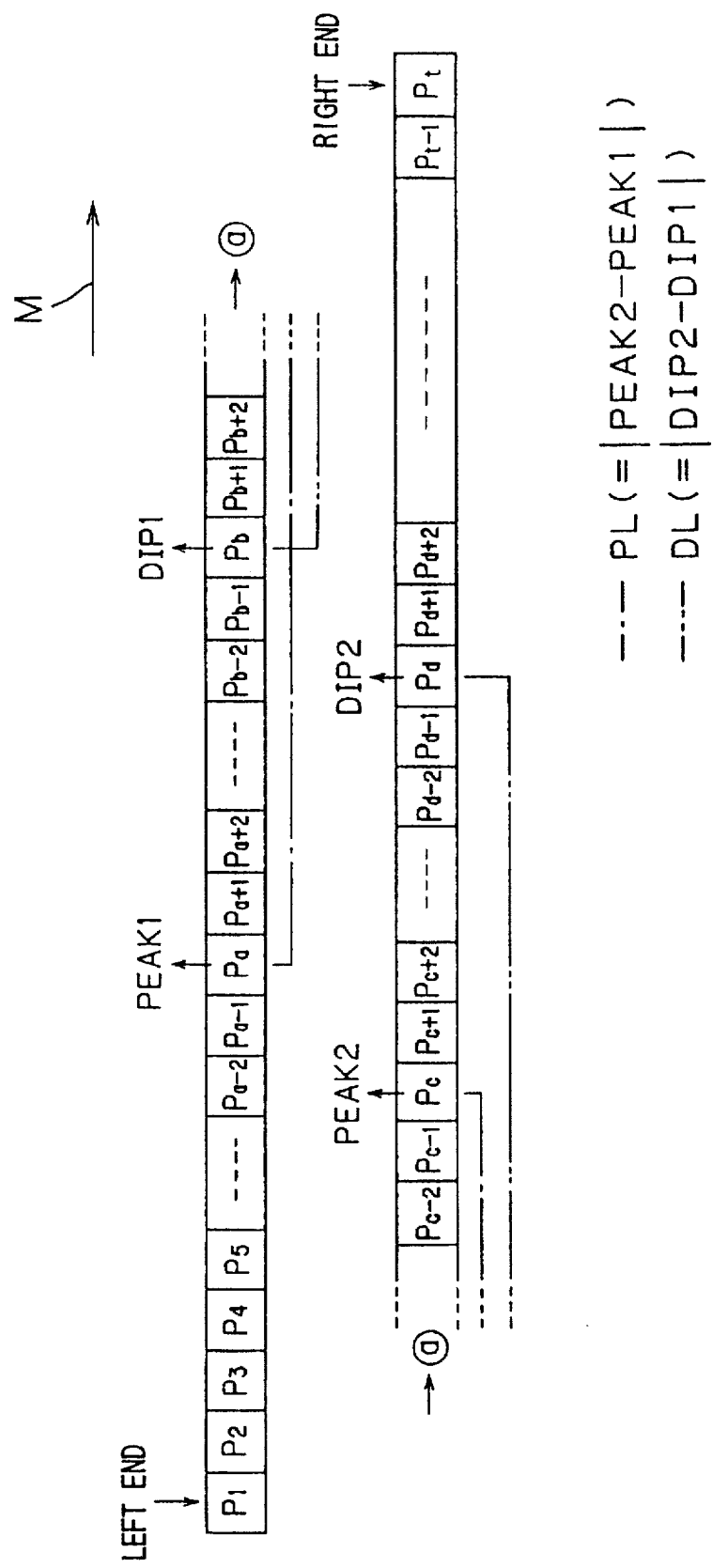
FIG. 15 is a diagram for explaining the flow of detecting peak pixels and dip pixels.

For example, it is assumed that image data corresponding to one line including pixels $P_1$ to $P_t$ are stored in a line memory 61, as shown in FIG. 15. When a pixel $P_a$ is a target pixel, image data $D_{a-2}$, $D_{a-1}$, $D_a$ and $D_{a+1}$ respectively corresponding to pixels $P_{a-2}$, $P_{a-1}$, $P_a$ and $P_{a+1}$ are read in by the peak detecting section 63. At this time, if all the conditions indicated by the foregoing expressions (1), (2) and (3) hold, the peak detecting section 63 detects the target pixel $P_a$ as a peak pixel.

When the target pixel $P_a$ is detected as a peak pixel, the peak detecting section 63 stores the position of the target pixel $P_a$ as PEAK1 in a PEAK1 storing section 651.

After PEAK1 has been stored in the PEAK1 storing section 651, the dip detecting section 73 then reads image data $D_{a-1}$, $D_a$, $D_{a+1}$ and $D_{a+2}$ respectively corresponding to four pixels $P_{a-1}$, $P_a$, $P_{a+1}$ and $P_{a+2}$ which are respectively shifted by one pixel in the main scanning direction M from the four pixels $P_{a-2}$, $P_{a-1}$, $P_a$ and $P_{a+1}$ which have been read when the peak pixel $P_a$ has been detected. At this time, the pixel $P_{a+1}$ is a target pixel.

It is judged on the basis of the conditions indicated by the foregoing expressions (4), (5) and (6) whether or not the target pixel $P_{a+1}$ is a dip pixel which is the trough between dots constituting a dotted image area. More specifically, when all conditions indicated by the following expressions (4a), (5a) and (6a) are satisfied, the target pixel $P_{a+1}$ is detected as a dip pixel:

$$D_{a-1} - D_{a+1} > d_{TH1} \text{ or } D_a - D_{a+1} > d_{TH2} \quad (4a)$$

$$D_{a+1} D_{a+2} \quad (5a)$$

$$D_{a+2} > d_{TH3} \quad (6a)$$

In the dip detecting section 73, dip pixel detecting processing is not performed with respect to two pixels $P_1$ and $P_2$ at the left end of an original image and one pixel $P_t$ at the right end thereof. However, no problem particularly occurs even if the pixels at the ends of the original image are ignored, as in the case of peak pixel detecting processing.

If at least one of the conditions indicated by the foregoing expressions (4), (5) and (6) does not hold, it is judged that the target pixel $P_{a+1}$ is not a dip pixel. When it is judged that the target pixel $P_{a+1}$ is not a dip pixel, the dip detecting section 73 reads image data $D_a$, $D_{a+1}$, $D_{a+2}$ and $D_{a+3}$ respectively corresponding to pixels $P_a$, $P_{a+1}$, $P_{a+2}$ and $P_{a+3}$ which are respectively shifted by one pixel in the main scanning direction M from the pixels $P_{a-1}$, $P_a$, $P_{a+1}$ and $P_{a+2}$. At this time, the pixel $P_{a+2}$ is a target pixel. The same dip pixel detecting processing as the foregoing is performed. Such dip pixel detecting processing is repeated until a dip pixel is detected.

For example, suppose that a pixel $P_b$ is judged to be a dip pixel on the basis of image data $D_{b-2}$, $D_{b-1}$, $D_b$ and $D_{b+1}$ respectively corresponding to pixels $P_{b-2}$, $P_{b-1}$, $P_b$ and $P_{b+1}$.

The dip detecting section 73 stores the position of the pixel $P_b$ as DIP1 in a DIP1 storing section 751 on the basis of the judgment.

After DIP1 has been stored in the DIP1 storing section 751, image data $D_{b-1}$, $D_b$, $D_{b+1}$ and $D_{b+2}$ respectively corresponding to pixels $P_{b-1}$, $P_b$, $P_{b+1}$ and $P_{b+2}$ which are respectively shifted by one pixel in the main scanning direction M from the pixels $P_{b-2}$, $P_{b-1}$, $P_b$ and $P_{b+1}$ are subsequently read in by the peak detecting section 63. At this time, the pixel $P_{b+1}$ is a target pixel. Peak pixel detecting processing is repeated until a peak pixel is detected in the same manner as described above.

For example, suppose that a pixel $P_c$ is judged to be a peak pixel on the basis of image data $D_{c-2}$, $D_{c-1}$, $D_c$ and $D_{c+1}$ respectively corresponding to pixels $P_{c-2}$, $P_{c-1}$, $P_c$ and $P_{c+1}$. At this time, the peak detecting section 63 stores the position of the pixel $P_c$ as PEAK2 in a PEAK2 storing section 652.

After PEAK2 has been stored in the PEAK2 storing section 652, the dip detecting section 73 then reads image data $D_{c-1}$, $D_c$, $D_{c+1}$ and $D_{c+2}$ respectively corresponding to pixels $P_{c-1}$, $P_c$, $P_{c+1}$ and $P_{c+2}$ which are respectively shifted by one pixel in the main scanning direction M from the pixels $P_{c-2}$, $P_{c-1}$, $P_c$ and $P_{c+1}$. The pixel $P_{c+1}$ is a target pixel. Dip pixel detecting processing is repeated until a dip pixel is detected in the same manner as described above.

As a result, when it is judged that a pixel $P_d$ is a dip pixel on the basis of image data $D_{d-2}$, $D_{d-1}$, $D_d$ and $D_{d+1}$ respectively corresponding to pixels $P_{d-2}$, $P_{d-1}$, $P_d$ and $P_{d+1}$, the position of the target pixel $P_d$ is stored as DIP2 in a DIP2 storing section 752.

After PEAK1, PEAK2, DIP1 and DIP2 have been thus respectively stored in the PEAK1 storing section 651, the PEAK2 storing section 652, and the DIP1 storing section 751 and the DIP2 storing section 752, the distance between PEAK1 and PEAK2 and the distance between DIP1 and DIP2 are respectively calculated in a PEAK difference calculating section 69 and a DIP difference calculating section 79. Respective outputs of the PEAK difference calculating section 69 and the DIP difference calculating section 79 are fed to a comparing section 70.

Since a dotted image area is an area where dots are periodically arranged, peak pixels each corresponding to the center of each of the dots and dip pixels each corresponding to troughs between the dots should appear in the same period.

In the comparing section 70, therefore, it is judged whether or not the difference between the distance PL between PEAK which is given from the PEAK difference calculating section 69 and the distance DL between DIP which is given from the DIP difference calculating section 79 is not more than a predetermined constant A corresponding to a predetermined number of pixels. Specifically, it is judged whether or not the following expression is satisfied:

$$|PL - DL| \leq A \quad (7)$$

where A is a constant.

Figure 14A:
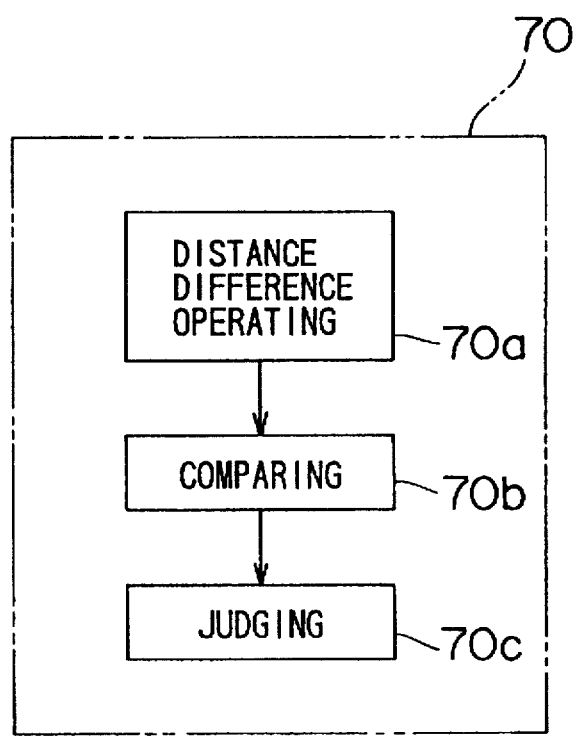
FIG. 14A is a block diagram for explaining the functional features of a comparing section.

To attain the above-described function, the comparing section 70 includes, as shown in FIG. 14A, a distance difference operating means 70a, a comparing means 70b, and a judging means 70c. The distance difference operating means 70a operates the difference |PL−DL|. The comparing means 70b compares the difference |PL−DL| with the constant A. The judging means 70c judges that the continuous area including the both pairs of peak pixels and dip pixels belongs to a dotted image area.

"1", for example, is considered as the foregoing constant A. The reason for this will be described.

Figure 16A:
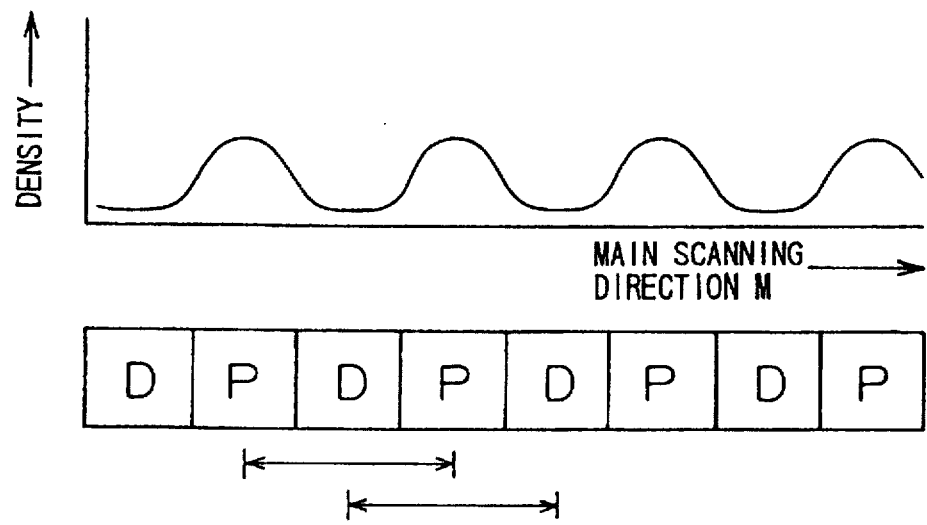
FIGS. 16A and 16B are diagrams for explaining a way of the occurrence of peak pixels and dip pixels.
Figure 16B:
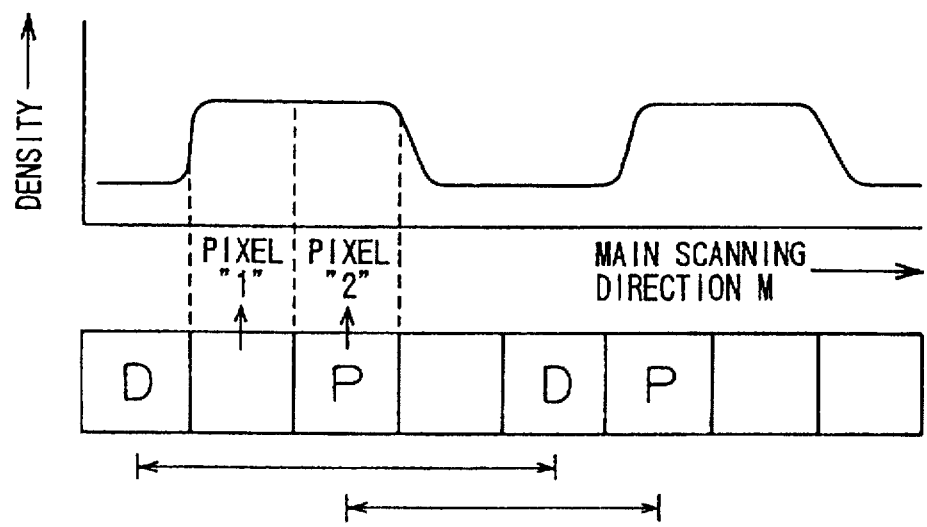

Suppose a case where the resolution of the scanner 1 is 400 pixels per inch, and the ruling of a dotted image area in an original image is 200, for example. In this case, the distance between peak pixels P and the distance between dip pixels D are generally entirely the same, as shown in FIG. 16A. However, if the resolution of the scanner 1 is 400 pixels per inch, and the ruling of a dotted image area in an original image is 100, for example, a dot ranges over two pixels, for example, detected by the scanner 1, as shown in FIG. 16B. At this time, a pixel "1" or "2" is detected as a peak pixel. The same is true for a dip pixel. In such a case, the distance between peak pixels includes an error of not more than one pixel, and the distance between dip pixels includes an error of not more than one pixel. Consequently, the possibility that the difference between the distance between peak pixels and the distance between dip pixels is not more than one pixel is great. Therefore, it is preferable that "1" is set as the constant A.

Figure 17:
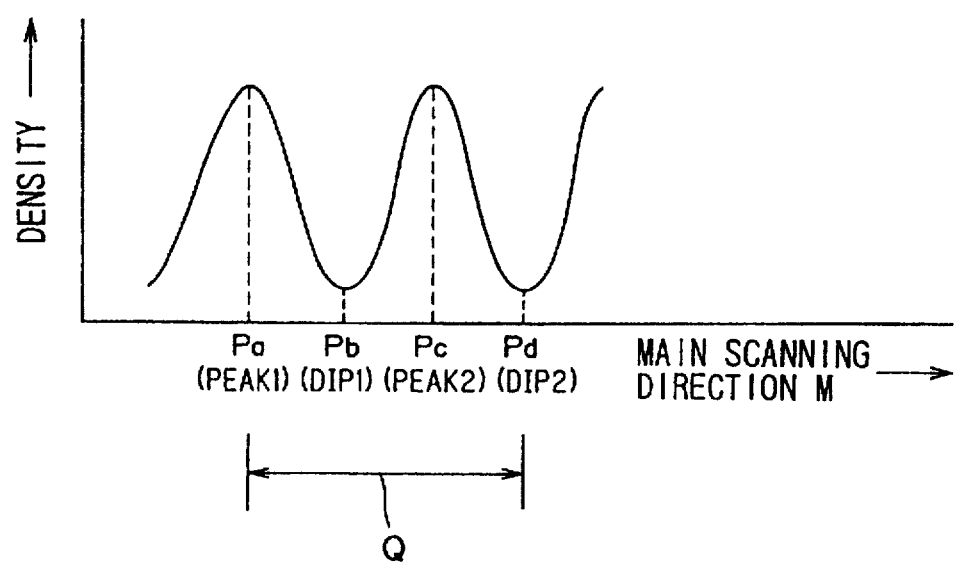
FIG. 17 is a diagram for explaining an area which is judged to be a dotted image area.

If the condition indicated by the foregoing expression (7) is satisfied, it is judged that all pixels from the pixel $P_a$ in the position of PEAK1 to the pixel $P_d$ in the position of DIP2 belong to a dotted image area. Specifically, it is judged that an area Q including all the pixels from the pixel $P_a$ to the pixel $P_d$ belongs to a dotted image area, as shown in FIG. 17, for example.

After the dotted image area judgment for the area Q from the pixel $P_a$ to the pixel $P_d$ has been terminated, PEAK2 and DIP2 which are respectively stored in the PEAK2 storing section 652 and the DIP2 storing section 752 are respectively moved to the PEAK1 storing section 651 and the DIP1 storing section 751. PEAK2 and DIP2 are utilized as PEAK1 and DIP1 in judging processing for the succeeding judging area.

When the above described dotted image area judging processing is repeatedly performed, to terminate dotted image area judging processing in a case where the pixel $P_{r-1}$ is taken as a target pixel, dotted image area judging processing for image data in an arbitrary color corresponding to arbitrary one line which are stored in the line memory 61 is terminated.

From the following reason, it is made a condition for terminating dotted image area judging processing that the pixel $P_{r-1}$ is taken as a target pixel. Specifically, peak pixel and dip pixel detecting processing requires pixels adjacent to a target pixel in the main scanning direction, as described above. Consequently, peak pixel or dip pixel detecting processing is not performed with respect to the pixel $P_r$ at the right end of the original image.

The above described dotted image area judging processing is performed for the other lines, and is further performed for image data in all colors, thereby to terminate all dotted image area judging processing.

As described in the foregoing, according to the present embodiment, dotted image area judging processing is performed on the basis of similarity of the occurrence of peak pixels and the occurrence of dip pixels. Therefore, the line memory 61 in which image data required to judge whether or not a judging area belongs to a dotted image area are to be stored need not have a capacity corresponding to a plurality of lines. Consequently, the scale of the memory can be reduced, as compared with the prior art in which image data corresponding to a plurality of lines are required to judge whether or not a judging area belongs to a dotted image area.

Since peak pixels and dip pixels are detected utilizing image data corresponding to a pixel spaced one pixel from a target pixel, the peak pixels and the dip pixels can be reliably detected irrespective of the size of each dot constituting a dotted image area and each pixel detected by the scanner 1.

In the present embodiment, PEAK2 and DIP2 which are respectively stored in the PEAK2 storing section 652 and the DIP2 storing section 752 are respectively utilized as PEAK1 and DIP1 in judging processing for the subsequent judging area. However, PEAK1 and DIP1 may be newly detected, for example, without using PEAK2 and DIP2 which have been detected in dotted image area judgment for the preceding area.

Furthermore, in the above described embodiment, PEAK1, DIP1, PEAK2 and DIP2 are detected in this order as the positions of peak pixels and dip pixels. DIP1, PEAK1, DIP2 and PEAK2 may be detected in this order as the positions of the peak pixels and the dip pixels in place of such processing.

Additionally, the conditions 1, 1'; 2, 2'; 3, 3'; 4, 4'; 5, 5'; 6, 6' described with reference to the above described first embodiment may be applied to peak pixel detection and dip pixel detection.

Although in the above described respective embodiments, description has been made of a digital color copying machine by way of example, the present invention is also applicable to other image forming apparatuses requiring processing for judging whether or not each of areas in an original image is a dotted image area, for example, a digital monochrome copying machine, a color/monochrome facsimile or a color/monochrome printer.

Although the present invention has been described and illustrated in detail, it is clearly understood that the description is by way of illustration and example only and is not to be taken by way of limitation, the spirit and scope of the present invention being limited only by the terms of the appended claims.

What is claimed is:

1. A dotted image area judging apparatus comprising:

storing means for storing image data corresponding to at least one line, the image data representing a density of each of pixels of an original image which is represented by a plurality of lines, each of the lines including a plurality of pixels;

detecting means for detecting peculiar point pixels on the basis of the image data stored in the storing means, the detecting means including means for successively setting a target pixel along a main scanning direction, comparing means for comparing image data corresponding to the target pixel with image data corresponding to pixels around the target pixel, and means for judging whether or not the target pixel is a peculiar point pixel on the basis of a result of a comparison made by the comparing means;

distance operating means for determining and operation on a distance between peculiar point pixels which are detected by the detecting means; and judging means for referring the distance between the peculiar point pixels which is operated on by the distance operating means to a predetermined judgment basis to judge whether or not a judging area including a finite number of pixels belongs to a dotted image area.

2. A dotted image area judging apparatus according to claim 1, further comprising judging area setting means for repeatedly setting a judging area including a finite number of pixels while successively shifting a judging area by a predetermined number of pixels at a time in the main scanning direction on one line corresponding to the image data stored in the storing means, the judging means judging for each judging area set by the judging area setting means, whether or not the judging area belongs to a dotted image area.

3. A dotted image area judging apparatus according to claim 2, wherein the judging area setting means sets a first pixel in a first judging area on each of the lines while shifting a first pixel by a predetermined number of pixels at a time in the main scanning direction for each line in a period of a predetermined number of lines.

4. A dotted image area judging apparatus according to claim 1, further comprising judging area setting means for repeatedly setting the judging area including a finite number of pixels while successively shifting a judging area in the main scanning direction on one line corresponding to the image data stored in the storing means and means for setting, if at least one peculiar point pixel is detected in one judging area, a succeeding judging area by taking as a first pixel the peculiar point pixel which is positioned on an uppermost stream side with respect to the main scanning direction in the judging area, the judging means judging for each judging area set by the judging area setting means, whether or not the judging area belongs to a dotted image area.

5. A dotted image area judging apparatus according to claim 1, further comprising registering means for registering peculiar point pixels which are detected by the detecting means, the distance operating means operating on the distance between the peculiar point pixels which are registered by the registering means.

6. A dotted image area judging apparatus according to claim 1, wherein the comparing means respectively compares the image data corresponding to the target pixel with each of image data corresponding to two pixels adjacent to the target pixel on an upstream side with respect to the main scanning direction and image data corresponding to one pixel adjacent to the target pixel on a downstream side with respect to the main scanning direction on one line corresponding to the image data stored in the storing means.

7. A dotted image area judging apparatus according to claim 1, wherein the judging means includes periodicity judging means for referring the distance between the peculiar point pixels which is found by the distance operating means to a predetermined statistical basis to judge whether or not an occurrence of the peculiar point pixels has predetermined periodicity, and means for judging the judging area to belong to a dotted image area if it is judged that the occurrence of the peculiar point pixels has the predetermined periodicity.

8. A dotted image area judging apparatus according to claim 7, wherein the periodicity judging means includes frequency detecting means for detecting a frequency of occurrence of the distance between the peculiar point pixels which is found by the distance operating means, and means for judging that the occurrence of the peculiar point pixels has the predetermined periodicity if a ratio of a maximum value of frequencies of occurrence which are detected by the frequency detecting means to a sum of the frequencies of occurrence is not less than a predetermined ratio.

9. A dotted image area judging apparatus according to claim 1, wherein peculiar point pixels include peak pixels.

10. A dotted image area judging apparatus according to any one of claims 1 to 8, wherein peculiar point pixels include dip pixels.

11. A dotted image area judging apparatus according to claim 1, wherein peculiar point pixels include peak pixels and dip pixels, the distance operating means operates, on the basis of respective positions of a pair of peak pixels and a pair of dip pixels which are continuously detected by the detecting means, a distance between the pair of peak pixels and a distance between the pair of dip pixels, and the judging means includes means for operating a difference between the distance between the pair of peak pixels and the distance between the pair of dip pixels, means for comparing the difference between the distances with a predetermined value, and means for judging that a continuous area including the pair of peak pixels and the pair of dip pixels belong to a dotted image area if the difference between the distances is not more than the predetermined value.

12. A method of judging a dotted image area, comprising the steps of:

storing image data corresponding to at least one line in storing means, the image data representing a density of each of pixels of an original image which is represented by a plurality of lines, each of the lines including a plurality of pixels;

successively setting a target pixel along a main scanning direction on a line corresponding to the image data stored in the storing means;

comparing image data corresponding to the target pixel with image data corresponding to pixels around the target pixel;

judging whether or not the target pixel is a peculiar point pixel on the basis of a result of a comparison;

determines and operating on a distance between peculiar point pixels; and referring an operated distance between the peculiar point pixels to a predetermined judgment basis to judge whether or not a judging area including a finite number of pixels belongs to a dotted image area.

13. A method according to claim 12, further comprising the step of repeatedly setting a judging area including the finite number of pixels while successively shifting the judging area by a predetermined number of pixels at a time in the main scanning direction on one line corresponding to the image data stored in the storing means, the step of judging whether or not the judging area is a dotted image area including the step of judging whether or not the set judging area belongs to a dotted image area for each judging area.

14. A method according to claim 13, wherein the step of setting the judging area includes the step of setting a first pixel in a first judging area on each of the lines while shifting the first pixel by a predetermined number of pixels at a time in the main scanning direction for each line in a period of a predetermined number of lines.

15. A method according to claim 12, further comprising the steps of repeatedly setting a judging area including the finite number of pixels while successively shifting the judging area in the main scanning direction on one line corresponding to the image data stored in the storing means, and setting, if at least one peculiar point pixel is detected in one judging area, a succeeding judging area by taking as a first pixel a peculiar point pixel positioned on an uppermost stream side with respect to the main scanning direction in the judging area, the step of judging whether or not the set judging area belongs to a dotted image area including the step of judging whether or not the judging area is a dotted image area for each judging area.

16. A method according to claim 12, wherein the step of comparing the image data corresponding to the target pixel with the image data corresponding to the pixels around the target pixel includes the step of respectively comparing the image data corresponding to the target pixel with each of image data corresponding to two pixels adjacent to the target pixel on an upstream side with respect to the main scanning direction and image data corresponding to one pixel adjacent to the target pixel on a downstream side with respect to the main scanning direction.

17. A method according to claim 12, wherein the step of judging whether or not the judging area belongs to a dotted image area includes the steps of referring the operated distance between peculiar point pixels to a predetermined statistical basis to judge whether or not an occurrence of the peculiar point pixels has a predetermined periodicity, and judging that the judging area belongs to a dotted image area if it is judged that the occurrence of the peculiar point pixels has the predetermined periodicity.

18. A method according to claim 17, wherein the step of judging whether or not the occurrence of the peculiar point pixels has the predetermined periodicity includes the steps of detecting a frequency of occurrence of the operated distance between the peculiar point pixels and judging that the occurrence of the peculiar point pixels has the predetermined periodicity if a ratio of a maximum value of detected frequencies of occurrence to a sum of the frequencies of occurrence is not less than a predetermined ratio.

19. A method according to claim 12, wherein peculiar point pixels include peak pixels.

20. A method according to claim 12, wherein peculiar point pixels include dip pixels.

21. A method according to claim 12, wherein peculiar point pixels include peak pixels and dip pixels, the step of operating on the distance includes the step of operating, on the basis of respective positions of a pair of peak pixels and a pair of dip pixels which are continuously judged to be the peculiar point pixels, on the distance between the pair of peak pixels and the distance between the pair of dip pixels, and the step of judging whether or not the judging area belongs to a dotted image area includes the steps of operating on a difference between the distance between the pair of peak pixels and the distance between the pair of dip pixels, comparing the difference between the distances with a predetermined value, and judging that a continuous area including the pair of peak pixels and the pair of dip pixels belongs to a dotted image area if the difference between the distances is not more than the predetermined value.

* * * * *